(12) United States Patent
Johnson et al.

(10) Patent No.: US 7,020,532 B2
(45) Date of Patent: Mar. 28, 2006

(54) METHODS AND APPARATUS FOR CONTROL USING CONTROL DEVICES THAT PROVIDE A VIRTUAL MACHINE ENVIRONMENT AND THAT COMMUNICATE VIA AN IP NETWORK

(75) Inventors: Alexander Johnson, Houston, TX (US); Paul C. Badavas, Southboro, MA (US); T. Eric Christiansen, Fall River, MA (US); Peter D. Hansen, Wellesley, MA (US); Thomas B. Kinney, Franklin, MA (US); Seyamak Keyghobad, Marion, MA (US); Bo Ling, Sharon, MA (US); Richard L. Thibault, Plainville, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 10/756,187

(22) Filed: Jan. 13, 2004

(65) Prior Publication Data

US 2004/0254648 A1 Dec. 16, 2004

Related U.S. Application Data

(63) Continuation of application No. 09/591,604, filed on Jun. 9, 2000, now Pat. No. 6,788,980.

(60) Provisional application No. 60/149,276, filed on Aug. 17, 1999, provisional application No. 60/144,693, filed on Jul. 20, 1999, provisional application No. 60/139,071, filed on Jun. 11, 1999.

(51) Int. Cl.
  *G05B 19/42* (2006.01)
(52) U.S. Cl. .................. 700/89; 700/1; 700/2; 700/18; 700/19; 700/86; 717/5; 717/6; 717/10; 717/11; 709/220; 709/223; 709/224

(58) Field of Classification Search .................... 700/1, 700/2, 18, 19, 86, 89, 48; 717/1, 5, 6, 10, 717/11, 9; 718/1, 100, 103; 709/220, 223, 709/224
See application file for complete search history.

(56) References Cited

U.S. PATENT DOCUMENTS

| | | |
|---|---|---|
| 3,810,119 A | 5/1974 | Zieve et al. |
| 3,825,905 A | 7/1974 | Allen, Jr. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,410,942 A | 10/1983 | Milligan et al. |
| 4,423,486 A | 12/1983 | Berner |
| 4,428,044 A | 1/1984 | Liron |
| 4,435,762 A | 3/1984 | Milligan et al. |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,609,995 A | 9/1986 | Hasebe |
| 4,615,001 A | 9/1986 | Hudgins, Jr. |
| 4,628,437 A | 12/1986 | Poschmann et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,742,349 A | 5/1988 | Miesterfeld et al. |
| 4,750,109 A | 6/1988 | Kita |
| 4,790,762 A | 12/1988 | Harms et al. |
| 4,805,107 A | 2/1989 | Kieckhafer et al. |

| Patent No. | Date | Inventor(s) | Patent No. | Date | Inventor(s) |
|---|---|---|---|---|---|
| 4,816,996 A | 3/1989 | Hill et al. | 5,475,856 A | 12/1995 | Kogge |
| 4,817,094 A | 3/1989 | Lebizay et al. | 5,481,741 A | 1/1996 | McKaskle et al. |
| 4,872,106 A | 10/1989 | Slater | 5,483,660 A | 1/1996 | Yishay |
| 4,897,777 A | 1/1990 | Janke et al. | 5,485,620 A | 1/1996 | Sadre et al. |
| 4,910,658 A | 3/1990 | Dudash et al. | 5,490,276 A | 2/1996 | Doli, Jr. et al. |
| 4,910,691 A | 3/1990 | Skeirik | 5,493,534 A | 2/1996 | Mok |
| 4,918,690 A | 4/1990 | Markkula, Jr. et al. | 5,504,902 A | 4/1996 | McGrath et al. |
| 4,958,277 A | 9/1990 | Hill et al. | 5,509,811 A | 4/1996 | Homic |
| 4,959,774 A | 9/1990 | Davis | 5,513,095 A | 4/1996 | Pajonk |
| 4,965,717 A | 10/1990 | Cutts, Jr. et al. | 5,513,192 A | 4/1996 | Janku et al. |
| 4,965,742 A | 10/1990 | Skeirik | 5,513,354 A | 4/1996 | Dwork et al. |
| 4,965,880 A | 10/1990 | Petitjean | 5,517,655 A | 5/1996 | Collins et al. |
| 4,991,170 A | 2/1991 | Kem | 5,519,701 A | 5/1996 | Colmant et al. |
| 5,008,805 A | 4/1991 | Fiebig et al. | 5,522,044 A | 5/1996 | Pascucci et al. |
| 5,050,165 A | 9/1991 | Yoshioka et al. | 5,530,643 A | 6/1996 | Hodorowski |
| 5,068,778 A | 11/1991 | Kosem et al. | 5,539,909 A | 7/1996 | Tanaka |
| 5,122,948 A | 6/1992 | Zapolin | 5,544,008 A | 8/1996 | Dimmick et al. |
| 5,129,087 A | 7/1992 | Will | 5,549,137 A | 8/1996 | Lenz et al. |
| 5,131,092 A | 7/1992 | Sackmann et al. | 5,550,980 A | 8/1996 | Pascucci et al. |
| 5,134,574 A | 7/1992 | Beaverstock et al. | 5,551,047 A | 8/1996 | Mori et al. |
| 5,136,704 A | 8/1992 | Danielsen et al. | 5,555,213 A | 9/1996 | DeLong |
| 5,138,708 A | 8/1992 | Vosbury | 5,555,437 A | 9/1996 | Packer |
| 5,146,589 A | 9/1992 | Peet, Jr. et al. | 5,555,510 A | 9/1996 | Verseput et al. |
| 5,151,978 A | 9/1992 | Bronikowski et al. | 5,559,963 A | 9/1996 | Gregg et al. |
| 5,151,981 A | 9/1992 | Westcott et al. | 5,566,320 A | 10/1996 | Hubert |
| 5,159,673 A | 10/1992 | Sackmann et al. | 5,568,378 A | 10/1996 | Wojsznis et al. |
| 5,162,986 A | 11/1992 | Graber et al. | 5,572,673 A | 11/1996 | Shurts |
| 5,163,055 A | 11/1992 | Lee et al. | 5,576,946 A | 11/1996 | Bender et al. |
| 5,166,685 A | 11/1992 | Campbell, Jr. et al. | 5,579,220 A | 11/1996 | Barthel et al. |
| 5,168,276 A | 12/1992 | Huston et al. | 5,579,487 A | 11/1996 | Meyerson et al. |
| 5,168,441 A | 12/1992 | Onarheim et al. | 5,581,760 A | 12/1996 | Atkinson et al. |
| 5,175,829 A | 12/1992 | Stumpf et al. | 5,586,112 A | 12/1996 | Tabata |
| 5,193,175 A | 3/1993 | Cutts, Jr. et al. | 5,586,329 A | 12/1996 | Knudsen et al. |
| 5,212,784 A | 5/1993 | Sparks | 5,586,330 A | 12/1996 | Knudsen et al. |
| 5,233,615 A | 8/1993 | Goetz | 5,587,899 A | 12/1996 | Ho et al. |
| 5,245,704 A | 9/1993 | Weber et al. | 5,594,858 A | 1/1997 | Blevins |
| 5,255,367 A | 10/1993 | Bruckert et al. | 5,594,899 A | 1/1997 | Knudsen et al. |
| 5,258,999 A | 11/1993 | Wernimont et al. | 5,596,331 A | 1/1997 | Bonaffini et al. |
| 5,271,013 A | 12/1993 | Gleeson | 5,596,752 A | 1/1997 | Knudsen et al. |
| 5,283,729 A | 2/1994 | Lloyd | 5,598,536 A | 1/1997 | Slaughter, III et al. |
| 5,289,365 A | 2/1994 | Caldwell et al. | 5,600,845 A | 2/1997 | Gilson |
| 5,295,258 A | 3/1994 | Jewett et al. | 5,604,871 A | 2/1997 | Pecone |
| 5,297,143 A | 3/1994 | Fridrich et al. | 5,611,057 A | 3/1997 | Pecone et al. |
| 5,302,952 A | 4/1994 | Campbell, Jr. et al. | 5,613,148 A | 3/1997 | Bezviner et al. |
| 5,303,227 A | 4/1994 | Herold et al. | 5,617,540 A | 4/1997 | Civanlar et al. |
| 5,303,375 A | 4/1994 | Collins et al. | 5,623,592 A | 4/1997 | Carlson et al. |
| 5,303,392 A | 4/1994 | Carney et al. | 5,627,979 A | 5/1997 | Chang et al. |
| 5,307,372 A | 4/1994 | Sawyer et al. | 5,629,949 A | 5/1997 | Zook |
| 5,307,463 A | 4/1994 | Hyatt et al. | 5,630,056 A | 5/1997 | Horvath et al. |
| 5,317,726 A | 5/1994 | Horst | 5,630,152 A | 5/1997 | DeLuca et al. |
| 5,335,221 A | 8/1994 | Snowbarger et al. | 5,642,511 A | 6/1997 | Chow et al. |
| 5,347,181 A | 9/1994 | Ashby et al. | 5,649,121 A | 7/1997 | Budman et al. |
| 5,349,343 A | 9/1994 | Oliver | 5,655,092 A | 8/1997 | Ojala |
| 5,352,033 A | 10/1994 | Gresham et al. | 5,659,680 A | 8/1997 | Cunningham et al. |
| 5,359,721 A | 10/1994 | Kempf et al. | 5,664,101 A | 9/1997 | Picache |
| 5,371,895 A | 12/1994 | Bristol | 5,664,168 A | 9/1997 | Yishay et al. |
| 5,381,529 A | 1/1995 | Matsushima | 5,671,374 A | 9/1997 | Postman et al. |
| 5,390,321 A | 2/1995 | Proesel | 5,676,141 A | 10/1997 | Hollub |
| 5,398,331 A | 3/1995 | Huang et al. | 5,680,404 A | 10/1997 | Gray |
| 5,400,140 A | 3/1995 | Johnston | 5,680,409 A | 10/1997 | Qun et al. |
| 5,410,717 A | 4/1995 | Floro | 5,682,476 A | 10/1997 | Tapperson et al. |
| 5,428,781 A | 6/1995 | Duault et al. | 5,687,316 A | 11/1997 | Graziano et al. |
| 5,432,711 A | 7/1995 | Jackson et al. | 5,701,414 A | 12/1997 | Cheng et al. |
| 5,434,997 A | 7/1995 | Laundry et al. | 5,708,779 A | 1/1998 | Graziano et al. |
| 5,442,639 A | 8/1995 | Crowder et al. | 5,719,761 A | 2/1998 | Gatti et al. |
| 5,444,851 A | 8/1995 | Woest | 5,726,912 A | 3/1998 | Krall et al. |
| 5,450,403 A | 9/1995 | Ichii et al. | 5,727,128 A | 3/1998 | Morrison |
| 5,450,425 A | 9/1995 | Gunn et al. | 5,732,218 A | 3/1998 | Bland et al. |
| 5,450,764 A | 9/1995 | Johnston | 5,737,529 A | 4/1998 | Dollin, Jr. et al. |
| 5,451,939 A | 9/1995 | Price | 5,742,762 A | 4/1998 | Scholl et al. |
| 5,457,797 A | 10/1995 | Butterworth et al. | 5,748,467 A | 5/1998 | Qin et al. |
| 5,459,839 A | 10/1995 | Swarts et al. | 5,751,574 A | 5/1998 | Loebig |
| 5,463,735 A | 10/1995 | Pascucci et al. | 5,752,007 A | 5/1998 | Morrison |

| | | |
|---|---|---|
| 5,752,008 A | 5/1998 | Bowling |
| 5,752,246 A | 5/1998 | Rogers et al. |
| 5,754,772 A | 5/1998 | Leaf |
| 5,758,073 A | 5/1998 | Liang et al. |
| 5,758,075 A | 5/1998 | Graziano et al. |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,670 A | 6/1998 | Montulli |
| 5,777,874 A | 7/1998 | Flood et al. |
| 5,790,791 A | 8/1998 | Chong et al. |
| 5,793,963 A | 8/1998 | Tapperson et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,805,442 A | 9/1998 | Crater et al. |
| 5,805,922 A | 9/1998 | Sim et al. |
| 5,822,220 A | 10/1998 | Baines |
| 5,828,851 A | 10/1998 | Nixon et al. |
| 5,831,669 A | 11/1998 | Adrain |
| 5,832,418 A | 11/1998 | Meyer |
| 5,838,563 A | 11/1998 | Dove et al. |
| 5,838,920 A | 11/1998 | Rosborough |
| 5,841,360 A | 11/1998 | Binder |
| 5,841,654 A | 11/1998 | Verissimo et al. |
| 5,841,963 A | 11/1998 | Nakamikawa et al. |
| 5,844,601 A | 12/1998 | McPheely et al. |
| 5,844,804 A | 12/1998 | Schussler |
| 5,847,957 A | 12/1998 | Cohen et al. |
| 5,854,750 A | 12/1998 | Phillips et al. |
| 5,854,944 A | 12/1998 | Catherwood et al. |
| 5,862,052 A | 1/1999 | Nixon et al. |
| 5,867,704 A | 2/1999 | Tanaka |
| 5,872,992 A | 2/1999 | Tietjen et al. |
| 5,873,089 A | 2/1999 | Regache |
| 5,874,990 A | 2/1999 | Kato |
| 5,880,775 A | 3/1999 | Ross |
| 5,903,455 A | 5/1999 | Sharpe, Jr. et al. |
| 5,909,368 A | 6/1999 | Nixon et al. |
| 5,930,768 A | 7/1999 | Hooban |
| 5,940,294 A | 8/1999 | Dove |
| 5,956,487 A | 9/1999 | Venkatraman et al. |
| 5,960,214 A | 9/1999 | Sharpe, Jr. et al. |
| 5,975,737 A | 11/1999 | Crater et al. |
| 5,978,578 A | 11/1999 | Azarya et al. |
| 5,980,078 A | 11/1999 | Krivoshein et al. |
| 5,980,090 A | 11/1999 | Royal, Jr. et al. |
| 5,982,362 A | 11/1999 | Crater et al. |
| 5,988,852 A | 11/1999 | Nakanishi |
| 5,994,998 A | 11/1999 | Fisher et al. |
| 5,995,916 A | 11/1999 | Nixon et al. |
| 6,002,104 A | 12/1999 | Hsu |
| 6,014,591 A | 1/2000 | Ikeda |
| 6,014,612 A | 1/2000 | Larson et al. |
| 6,026,352 A | 2/2000 | Burns et al. |
| 6,032,208 A | 2/2000 | Nixon et al. |
| 6,035,264 A | 3/2000 | Donaldson et al. |
| 6,038,486 A | 3/2000 | Saitoh et al. |
| 6,049,775 A | 4/2000 | Gertner |
| 6,052,629 A | 4/2000 | Leatherman et al. |
| 6,055,633 A | 4/2000 | Schrier et al. |
| 6,061,603 A | 5/2000 | Papadopoulos et al. |
| 6,078,320 A | 6/2000 | Dove et al. |
| 6,085,120 A | 7/2000 | Schwerdtfeger et al. |
| 6,094,600 A | 7/2000 | Sharpe et al. |
| 6,095,674 A | 8/2000 | Verissimo et al. |
| 6,098,116 A | 8/2000 | Nixon et al. |
| 6,115,468 A | 9/2000 | De Nicolo |
| 6,129,449 A | 10/2000 | McCain et al. |
| 6,139,177 A | 10/2000 | Venkatraman et al. |
| 6,140,911 A | 10/2000 | Fisher et al. |
| 6,151,625 A | 11/2000 | Swales et al. |
| 6,176,421 B1 | 1/2001 | Royal, Jr. et al. |
| 6,201,996 B1 | 3/2001 | Crater et al. |
| 6,212,440 B1 | 4/2001 | Suzuki |
| 6,218,930 B1 | 4/2001 | Katzenberg et al. |
| 6,405,099 B1 | 6/2002 | Nagai et al. |
| 6,424,883 B1 | 7/2002 | Hosokawa et al. |
| 6,501,995 B1 * | 12/2002 | Kinney et al. ................. 700/1 |
| 6,510,352 B1 * | 1/2003 | Badavas et al. .............. 700/19 |
| 6,574,515 B1 | 6/2003 | Kirkpatrick et al. |
| 6,675,193 B1 | 1/2004 | Slavin et al. |
| 6,760,687 B1 | 7/2004 | Apel et al. |
| 6,788,980 B1 * | 9/2004 | Johnson ........................ 700/1 |
| 6,806,847 B1 | 10/2004 | Nixon et al. |
| 6,850,973 B1 | 2/2005 | Larson et al. |
| 2001/0037489 A1 * | 11/2001 | Stripf et al. ................... 717/1 |
| 2002/0150156 A1 | 10/2002 | Calvin |
| 2004/0103165 A1 | 5/2004 | Nixon et al. |

FOREIGN PATENT DOCUMENTS

| | | |
|---|---|---|
| EP | 0 411 869 A3 | 7/1990 |
| JP | 11-143511 | 5/1999 |
| WO | WO 96/31047 | 3/1996 |
| WO | WO 98/29804 | 7/1996 |
| WO | WO 96/23377 | 8/1996 |
| WO | WO 97/07486 | 2/1997 |
| WO | WO 97/26587 | 7/1997 |
| WO | WO 98/20649 | 5/1998 |
| WO | WO 98/36518 | 8/1998 |
| WO | WO 98/54843 | 12/1998 |
| WO | WO 0077592 A2 * | 12/2000 |

OTHER PUBLICATIONS

Wang, Lithui et al. "Agent-based Intelligent Control System Design For Real-time Distributed Manufacturing Environments". Agent-based Manufacturing Workshop, Autonomous Agents '98. Minneapolis/St. Paul, May 9-13, 1998, pp. 152-159.

Stevens, et al. "TCP/IP Illustrated , vol. 1 The Protocols," TCP/IP Illustrated vol. 1 XP-002106390, Dec. 30, 1993, pp. 85-96.

IC Card Design Sep./Oct. 1995 (49 pages).

Strack, "The HAWK is soaring," Chemical Processing, p. 11, May 1996.

"Control System Features Plu-and-Play Technology, Scalability," Chemical Processing, p. 33, May, 1996.

"Editors Project Picks," Chemical Processing, p. 34, May, 1996.

"Tribe Computer Works' Net Products Can be Managed via World Wide Web," IAC (SM) Newsletter Database198 , Data Trends Publications, Inc., No. 11, vol. 7, May 30, 1995.

"Briefs" Netowrk World, p. 19, May 29, 1995.

Wilder, "Network Management; Russing Nets via the Web—Tribe's WebManage uses popular interface," Information Week, p. 62, May 29, 1995.

"Pipeline; Announced," InforWorld, p. 45, May 29, 1995.

Bernard, "Remote-access ware emerge; Shiva, Nortel, and Tribe leading list of innovators," PC Week, No. 21, vol. 12, p. 47, May 29, 1995.

"Tribe Announces Revolutionary Use Of The Internet, Launches Innovative Remote Management Solution; New WebManage Technology Provides Network Management via World Wide Web," Business Wire, May 22, 1995.

"Tribe Announces Revolutionary Device Capable of Being Managed via Internet Web Browser; TribeLink2 Enables Remote Computing and Internet Access," Business Wire, May 22, 1995.

Dryden, "Tribes WebManage Enables Remote frixes," ComputerWorld, p. 14, May 22, 1995.

Ko, "Tribe Defines Net Management Role for Web Browser Software," Network World, p. 14, May 22, 1995.

"Tour an Actual TribeLink via WebManage," web page print-out from http://www.tribe.com/products/webmanage/quick$_{13}$view htm.

"Tribe Launches Innovative Remote Mangament Solution; New WebManage Technology Provides Network Management via the World Wide Web," web page print out, Jul. 12, 1999, from http://www.tribe.com/products/webmanage/wm$_{13}$pr.

"TribeRoute," web page printout (Jul. 12, 1999) from http://www.tribe.com/products/tr/index.

"TribeStar," web page print-out from http://www.tribe.com/products/tribestar/index.htm.

Pappalardo, "Router Can Be Managed via Net," Internet Week, p. 6, May 22, 1995.

Rodriguez, Tribe Sets Software, Interactive Age, vol. 2, No. 15, p. 25, May 22, 1995.

Welch, "Tribe to Manage via Web; Tribe Computer Works Inc.'s TribeLink2 Priduct Announcement," MacWEEK, vol. 9, No. 21, p. 18, May 22, 1995.

Pappalardo, "Digi Introduces IP/IPX Router," Internet Weel, p. 15, Apr. 24, 1995.

"WWWF 94: Papers Received," web page print-out (Apr. 7, 2000) from http://www.ncsa.uiuc.edu/SDG/IT94/Agenda/Papers-received.html.

Elmer-Dewitt, "Snowballs in Cyberspace; With a Modern and a Soldering Iron, you too can build an Internet site that is really cool and totally useless," Time, p. 57, Jan. 16, 1995.

Scharf, et al., "Using Mosaic for Remote Test System Control Supports Distributed Engineering," Institute of Computer-Aided Circuit Design—Test and Testsystems Division, University of Erlangen-Numberg, Germany, web page print-out from http://www.ncsa.uiuc.edu/SDG/IT94/Proceedings/CSW/scarf/scharf/html.

Cox, et al., "Robotic Telescopes: An Interactive Exhibit on the World-Wide Web," web page print-out from http://www.ncsa.uiuc.edu/SDG/IT94/Proceedings/Museum/cox/markcox.html (1994).

Gleick, "Fast Forward; Really Remote Control," The New York Times, Section 6, Col. 3, p. 42, Dec. 3, 1995.

Silverman, "Attaboy' for the best software and hardware of 1994," The Houston Chronicle, p. 2, Dec. 25, 1994.

Browne, "South Pole Ready for Internet Revolution," The New York Times, Section C, Col. 1, p. 1, Jan. 10, 1995.

Wolfe, "Strong Brew," Electronic Engineering Times, p. 73, Apr. 8, 1996.

"Special Topic: PC-Based Control," A Supplement to Software Strategies, p. 3-5, 7-8, 10-15, 20-21 (no date).

Momal, et al. "Using World-Wide-Web for Control Systems," from Proceedings 1995 International Conference on Accelerator and Large Experimental Physics Contril Systems, Chicago, IL Oct. 30-Nov. 3, 1995.

"The 'Only' Coke Machine on the Internet," web page print-out (Feb. 12, 1999) from http://www.cs.cmu.edu/~coke/history$_{13}$long.txt.

"CMU SCS Coke Machine: Current Status," web page print-out (Feb. 12, 1999) from http://www.cs.cmu.edu/~coke/.

"The Switzerland Coke Machine Credits," web page print-out (Feb. 12, 1999) from http://www.swiss.ai.mit.edu/htbin/coke.

"Peter Beebee's Home Page," web page print-out (Feb. 12, 1999) from http://www.swiss.ai.mit.edu/htbin/ptbbgate/wz/?fetch+personal%2Fmain.text.html.

"bsy's List of Internet Accessible Coke Machines," web page print-out (Feb. 12, 1999) from http://www.cse.ucsd.edu/users/bsy/coke.html.

"Disk Drive with Embedded Hyper-Text Markup Language Server," IBM TBD, vol. 38, No. 12. pp. 479-480, Dec. 1995.

Leon, "Tektronix to add Web Software on new printers," InfoWorld, p. 6, Dec. 4, 1995.

"I/A Series Model 51 FoxRemote II Installation and Configuration Guide," pp. I-iv, 1-2, Apr. 8, 1998.

"New State-Logic Microcontroller," News Release, Control Technology Corp. Jun. 1, 1996 (Dialog Web search result).

"New at IPC/921 Etherenet link provides Global PLC Registers," News Release, Control Technology (US), Nov. 20, 1992 (DialogWeb search result).

"New at IPC/921 High Capacity Integrated Motion Controller," News Release, Control Technology (US), Nov. 20, 1992 (DialogWeb search result).

"Dual-Axis Servo Module for Small Controller," News Release, Control Technology (US), Sep. 11, 1990 (DialogWeb search result).

"Innovative Small Controller Family offers Full Integration," News Release, Control Technology, Aug. 17, 1989 (DialogWeb search result).

"AC I/O Modules Available for Low-Cost Automation Controller," New Release, Control Technology Corporation, Jun. 28, 1989 (DialogWeb search result).

"New Small Automation Controller features Precision Analog I/O Modules," News Release, Control Technology (US), May 30, 1989 (DialogWeb search result).

"inexpensive Automation Controller features Message Display Capability," News Release, Control Technology (US) May 19, 1989 (DialogWeb search result).

"Small Multi-Tasking Controller for Cost-sensitive Applications," News Release, Control Technology (US), Nov. 8, 1988 (DialogWeb search result).

"CAD/CAM Software creates Automation 'Programming Environment', " News Release, Control Technology (US), Oct. 3, 1988 (DialogWeb search result).

"Automation Programming Environment runs on IBM (R)-PC," News Release, Control Technology (US), Mar. 29, 1988 (DialogWeb search result).

"Low-Cost Automation Controller features Motion Control, Communications," News Release, Control Technology (US) Mar. 7, 1988 (DialogWeb search result).

"System Provides Stepping Motor Control in Workcell Environment," News Release, Control Technology Corp., Dec. 5, 1986 (DialogWeb search result).

"Multi-Tasking Controller provides High-level Instructions for Motion Control, Sequencing," News Release, Control Technology Corporation, Aug. 22, 1986 (DialogWeb search results).

"Operators Console creates 'Friendly' Machines," News Release, Control Technology (US), May 19, 1986 (DialogWeb Search result).

"Automation Controller features fast 80186 Processor, Integrated Software," News Release, Control Technology (US), Apr. 22, 1986 (DialogWeb search result).

"Modular Valve Assemblies Connect to Controller with Ribbon Cable," New Product Release, Control Technology (US), Jan. 8, 1986 (DialogWeb search result).

"Linear Actuators offer Plug-Compatibility with Controller," News Release, Control Technology, (US), Nov. 21, 1985 (DialogWeb search result).

"Compact System combines Motion Control, Machine Control," News Release, Control Technology, May 28, 1985 (DialogWeb search result).

"Automation Controller accepts Customization," News Release, Control Technology, Jul. 12, 1985 (DialogWeb search result).

"SECS-11 Communication Board Plugs into Automation Controller," News Release, Control Technology, Aug. 26, 1985 (DialogWeb search result).

"Operator's Console for Automated Machines," News Release, Control Technology, Aug. 15, 1985 (DialogWeb search result).

"Programmable Controller offers control of Stepping and Servo Motors," News Release, Control Technology, May 31, 1985 (DialogWeb search result).

Taylor, et al. "A Telerobot on the World Wide Web," Jun. 29, 1999, printed from http://telerobot.mech.uwa.edu.au/ROBOT/telerobo.htm.

"On-Line Vending Machine and Catalog Product Icons," IBM TDB, vol. 38, No. 4, pp. 113-116 (Apr. 1995).

Tinham, et al., "Getting SCADA by web browser? Supervisory Control and Data Acquisition," Control and Instrumentation, vol. 28, No. 12, p. 5, Dec. 1996.

"Wizards wheel over SCADA systems; Supervisory Control and Data Acquisition," Control and Instrumentation, vol. 28, No. 12, p. 23, Dec. 1996.

Fulcher, et al., "Soft Control, Internet spark ISA/96," Manufacturing Systems, vol. 14, No. 12, pp. 40-46, Dec. 1996.

"Information technology in manufacturing," Manufacturing Systems, vol. 14, No. 12, pp. 54-78, Dec. 1996.

"A sensation in supervisory control," Manufacturing Systems (Windows NT in Manufacturing Supplement), pp. 12A-24A, Oct. 1996.

Demetratekes, "Go with the info flow; state-of-the-art automation in the food industry; includes related article on computer software for food processors," Food Processing, vol. 57, No. 7, p. 47, Jul. 1996.

"New Products Provide Interactive Graphics Over Web Using Netscape Plug-Ins and Java," PR Newswire, May 20, 1996.

"Integrated Systems; Industry's top embedded operating software supports java," M2 Presswire, Mar. 4, 1996.

"ErgoTech upgrades ErgoCim; First 'plug and play' component software for manufacturing," Business Wire, Feb. 15, 1996.

"Systems and Design; Technical Program and Exhibits Help Embedded Systems Design Professionals Keep Pace with Rapid Changes," PR Newswire, Dec. 27, 1995.

"Industry's top embedded operating software supports Java; pSOSystem enables Embedded Internet applications and Low-cost Internet appliances," Business Wire.

"Gensym introduces G2 WebMiner for accessing and reasoning about data from the World Wide Web," Business Wire, May 15, 1996.

"Gensym introduces Internet Connectivity for its G2 family of intelligent real-time software," Business Wire, May 18, 1996.

"Gensym announces Its Initiative for Leveraging Intelligent Systems with Internet/Intranet Technology," Business Wire, Oct. 7, 1997.

"At Interop, Will ToasterNet be on the Hot List?" Data Communications, vol. 19, No. 13, Oct. 1990, p. 214.

Zeff, "Maui Sunset in Real Time (Modems not Optional)," The New York Times, Section D, Col. 2, p. 5, Nov. 27, 1995.

Toner, "Web's view of world far and wide," The Houston Chronicle, p. 6, Nov. 5, 1995.

"Internet windows to the world," New Media Age, p. 4, Oct. 26, 1995.

Foster, "Surf's up: ;ights, camera, but no action; Steve is a Tech-Nomad. He wanders the streets with a camera on his head. And he wants you to join him," The Independent (London), p. 10, Aug. 13, 1995.

Henry, Jim, Ph.D., P.E., "LabVIEW Applications in Engineering Labs: Controls, Chemical, Environmental," ASEE Conference, Anaheim, CA, Jun. 25-28, 1995, web page print-out from http://chem..engr.utc.edu/Documents/ASEE-95-full.html.

"Jim Henry's 1996 ASEE Paper," web page print-out from http://chem..engr.utc.edu/Documents/ASEE-96-full-html.

"Breaking News for Invensys Software Systems Employees; iBaan and FactorySuite 2000 Integration Announced," Internal e-mail dated Mar. 23, 2001 (2 pages).

Gertz, M., et al., "A Human-Machine Interface for Distributed Virtual Laboratories," IEEE Robotics & Automation Magazine 1, No. 4, pp. 5-13, Dec. 1994.

Soreide, et al., "Mosaic Access to real-time data from the TOGA-TAO array of moored buoys," Computer Networks and ISDN Systems 28, pp. 189-197, (1995).

Goldstein, I. et al., "Guest Editorial," Computer Networks and ISDN Systems 28, p. 1 (1995).

Slater, A.F., "Controlled by the Web," Computer Networks and ISDN Systems 27, pp. 289-295 (1994).

Goldberg, K. et al., "Beyond the Web: manipulating the real world," Computer Networks and ISDN Systems 28 (1995) pp. 209-219.

Goldstein, I. et al. "Guest editorial," Computer Networks and ISDN Systems 28 (1995) p. 1.

Goldberg, K. et al. "Desktop Teleoperation via the World Wide Web," IEEE International Conference on Robotics and Automation, 1995, pp. 654-659.

"Disk Drive with Embedded Hyper-Text Markup Language Server," IBM TDB, Dec. 1995.

"Agenda" ISA/SP50—1988-180, ISA Draft (1 page).

Application of PRIAM Model to safety systems on offshore oil/gas platforms. Silvertech Ltd. Jan. 9, 1995.

"Automation System Monitors, Control fab HVAC, Other Systems," *Microcontamination* (Aug. 1994).

"Batch Control, Part I: Models and Terminology," (approved Feb. 28, 1995) ISA-S88.01 1995, pp. 1-128Baxter, R. Jr., "Implementing open networking in a motor drive," The Imbedded Internet Workshop Real World Applications Session (Oct. 1, 1999) San Jose, CA.

Beestermoller, HJ, et al. "An Online and offline programmable Multi-loop controller for distributed systems," IEEE (1994), pp. 15-20.

Benkhallat, Y. et al., "Interoperability of sensors and distributed systems," Sensors and Actuators A, vol. 37-38, pp. 247-254, 1993.

Blevins, Terry, "Characteristics of function block requirements for the process industry and manufacturing automation," Fisher-Rosemount, Oct. 31, 1995.

Brunn, P. "Collision Avoidance for Two Robots Sharing a Common Workspace," The Institution of Electrical Engineers, 1995.

Burton, P.I. "A personal history of batch control," *Measurement + Control*, vol. 27, pp. 69-73, Apr. 1994.

Burton, P.I., et al., "Field bus based on MIL-STD-1553B: Proposal to ISA-SP-50" ERA Technology Ltd., ISA/SP50-1988-148, pp. 1-125, Apr. 6, 1988.

Capetta, L. et al., "From current actuators and transmitters towards intelligent actuation and measurement: PRIAM approach," BIAS 93, pp. 1-15.

Caro, R., "Field bus applications,"ISA Paper #89-0569, pp. 989-994, 1989.

Caro, R., "The fifth generation process control architecture," ISA Paper #88-1487, pp. 659-667, 1988.

Chettle, T., "Multiplexing techniques optimize data collection," *Electrotechnology*, Oct./Nov. 1995.

Coleman, V. "National electrical manufacturers association field bus report to ISA SP50,".

Conference Record of the 1993 IEEE Industry Applications Conference, Part III (excerpt) pp. 24-31.

Contents and Proceedings of the Second International Workshop on Configurable Distributed Systems, Mar. 21-23, Pittsburgh, PA, pp. 5-7, 1994.

Craig, L. "SP-88 Defines Batch Control," *INTECH*, pp. 34-37, Mar. 1994.

Crowder, R.S., "A Communication architecture for automation & control," ISA, pp. 669-673.

Crowder, R.S., "Generic data link transactions for simple devices," Proposal to ISA SP 50 & IEC/SC65C/WG6, ISA document, Oct. 15, 1988.

Delahostria, Communication Model Application Layer ISA/SP50-1988-247, ISA draft, pp. 1-19, Oct. 14, 1988.

Delfino, B. et al., "Fieldbus Applications for Electrical Industrial Systems," *IEEE*, pp. 2084-2090, 1993.

Dezso, D. "Helozati szabalyozas," *Meres es Automatika*, vol. 37, pp. 208-213 (1989).

Dryden, P., "Tribes webmanage enables remote fixes," *Computerworld*, p. 14 (May 22, 1995).

Duffey, C.K., et al., "High Level Control Language Customizes Application Programs," *IEEE Computing Applications in Power*, pp. 15-18, 1991.

Editing Committee Draft Application Layer, Version 6, Dec. 1990 (260 pages).

Editing Committee Draft Application Layer, Version 8 May 1991 (344 pages).

Editing Committee Draft Application Layer, Version 12, Oct. 1991 (282 pages).

Esprit Project 6188, "PRIAM dictionary: major terms and definitions used in the PRIAM project," Prenormative requirements for intelligent actuation and measurement, May 1995 (14 pages).

ESPRIT Project 8244, "User Requirements for intelligent transmitters and actuators," European Intelligent Actuation and Measurement User Group, Nov. 24, 1995.

Fieldbus standard for use in industrial control systems. Part 2: Physical layer specification and service definition, ANSI/ISA-S50.02, pp. 1-103, 1992.

Foxboro Fieldbus Proposal (Presented to ISA SP-50 Committee Feb. 24, 1988) ISA/SP50-1988-123B, ISA draft, pp. l-xxii, 1-200.

Furness, H., "Fieldbus: The differences start from the bottom up," Control Engineering, pp. 75-77, Mar. 1994.

Goldberg, K. et al., "Beyond the web: Excavating the real world via mosaic," (Conference Paper) The Mercury Project, Oct. 17-21, 1994.

Gyorki, J., "PLCs drive standard buses," *Machine Design*, pp. 83-90, May 11, 1995.

Holding, D. et al., "Communications in microprocessor industrial implementation," *Microprocessors and Microsystems*, vol. 3, No. 10, pp. 443-451, Dec. 1979.

"Intel, SunDisk offerings narrow flash focus," Electronic Engineering Times, p. 10, Oct. 24, 1994.

Johnson, D., "Pressure advances: Are they in your processor's future?" Control Engineering, pp. 67-72, Apr. 1995.

Kelly, M., "Digital fieldbus cluster cuts plant's writing costs up to 20%," *INTECH*, pp. 62-64, Apr. 1995.

Ko, D., "Trobe [sic] defines net management role for Web browser software," *Network World*, p. 14, May 22, 1995.

Koth, H. et al., "The advantages of intelligent field modules for nuclear power plant operation and maintenance," Kemtechnik 60 (1996) 5-6, pp. 215-219.

Lenhart, G., "A field bus approach to local control networks," INTECH, pp. 31-34, Aug. 1994.

Meeting Minutes, SP50, International Electrotechnical Commission, Technical Committee No. 65: Industrial-Process Measurement and Control, Sub-Committee 65C: Digital Data Communications for Measurement and Control and Working Group 6, Feb. 29-Mar. 4, 1988, Arizona (143 pages).

Meeting Minutes, SP50.4 Application Layer, Oct. 19-21, 1988, Houston, TX (96 pages).

Meeting Minutes, Windows Working Group of Application Subcommittee, pp. 1-8 Mar. 1-3, 1989, New Orleans, LA.

Meeting Minutes, Ad Hoc function Block Meeting, pp. 1-60, Jun. 14, 1990, Chapel Hill, NC.

Meeting Minutes, SP50, Signal Compatibility of Electrical Instruments, Dec. 5-7, 1990 Orlando, FL (64 pages).

Meeting Minutes, Process Control Working Group of SP50. 4, Jan. 21-23m, 1991 Atlanta, GA (8 pages).

Meeting Notes, International Electrotechnical Commission Sub Committee No. 65C: Digital Communications Working Group 7, Process Control Function Blocks Report to AMT/7, Apr. 4, 1996 (42 pages).

Mirabella, O., "A short presentation of IEC fieldbus application layer," Informatics and Communication Institute, Engineering Faculty, University of Catania, Italy (no date).

Morel, G. et al., "Discrete even automation engineering: Outline of the PRIAM project," 12 pages (no date).

"NCR Fieldbus Slave Controller Advance Information," ISA-SP50-1988-161, ISA Draft, 4 pages 1988.

"New Equipment/Literature," Control Systems, Col. 130, No. 4, p. 114, Apr. 1995.

"New Open Architecture Group Works on Control Standards," Control Engineering Online, Aug. 1997.

"New Telemecanique Programmable Controllers Feature Multiple Programming Languages," Feb. 11, 1985, 4 pages.

Noah: Network Orientated Application Harmonisation based on General Purpose Field Communication System. Project description rev. 1.0, pp. 1-22 P-NET, PROFIBUS, WorldFIB, Oct. 25, 1995.

Nobuhiko, T. et al., "An advanced optical fieldbus instrumentation system using 16 x 16 reflection type optical star coupler and low powered transmitter," pp. 755-764.

"On-line Vending Machine and Catalog Product Icons," IBM TDB, vol. 38, No. 4, pp. 113-116, Apr. 1995.

Output to Valve, Revision No. 1.4, Jan. 18, 1991, (Draft Document), Instrument Society of America (38 pages).

Owen, S. et al., "A modular reconfigurable approach to the creation of flexible manufacturing cells for educational purposes," Fast Reconfiguration of Robotic and Automation Resources (Colloquium), The Institution of Electrical Engineers, Oct. 20, 1995 (17 pages).

Pace, H., "Valve actuators ready for fieldbus," Control Engineer, pp. 65-73, Oct. 1995.
Peshek, C., et al., "Recent Developments and Future Trends in PLC Programming Languages and Programming Tools for Real-Time Control," IEEE Cement Industry Technical Conference, pp. 219-230, Toronto, Canada, May 1993.
Petti, T. et al., "A Coupled Knowledge Based System Using Fuzzy Optimization for Advisory Control," IchE Journal, vol. 38, No. 9 pp. 1369-1378, Sep. 1992.
Pfeifer, T. et al. Sensorbetriebssystem fur messtechnische Problemstellungen in der Produktionstechnike, Technisches Messen, vol. 58, Nos. 7/8, 1991.
Phinney, T., "An Analysis of Contending Proposals in ISA Sp-50 for an ISA/IEC Field Instrument Bus," ISA, Paper #88-1489, 5 pages, 1988.
Pinto, J., "The great fieldbus debate—is over," Action Instruments (www.actionio.com) (originally published in Industrial Controls Intelligence, Nov. 1989).
Preface: Field Bus Process Control User Layer Technical Support, pp. 1-8, Feb. 10, 1993.
Product Specification, I/A Series® RBATCH II, Apr., 1995 (169 pages).
PROWAY-LAN Industrial Data Highway (Approved Feb. 3, 1986) ISA—S72.01-1985, 1985, pp. 1-204.
"Radio Field Bus," ISA/SP50—1988-184, ISA Draft, pp. 1-18, 1988.
Report from IEC TC65 Working Group 6 Function Blocks, May 1, 1995 (7 pages).
"Ricoh to sell world's first multimedia still camera," Japan Economic Newswire, Feb. 21, 1995.
Schuur, C. "Comments on Analysis and Suggestions for ISA-SP50' as submitted to the SP50 Committee by Honeywell Inc," ISA-SP50-1988-155, ISA Draft.
Schuur, C. et al., "Philips Token Passing Field Bus Controller Timed Token Mode," ISA/SP50—1988-186, ISA Draft.
"SDRD Using 1553B Data Link Services," ISA/SP50-1988-243 (1998) (5 pages).
Skabowski, E. L., "Recommendations for Consideration at Oct., 1988 Application Layer Subcommittee Meeting," 17 pages, Oct. 3, 1986.
Solvie, M., "Configuration of Distributed Time-Critical Fieldbus Systems," IEEE, p. 211, 1994.
Strothman, J, et al., "Alliances, Fieldbus, Windows Stir ISA/94 Anaheim Pot," INTECH, pp. 32-35, Dec. 1994.
Strothman, J, et al., "ISA/95 New Orleans: Open, NT winds (not Opal) blow strong," INTECH, pp. 45-48, Nov. 1995.
"Suggested Outline for Application Sub-committee Document: Fieldbus Architecture Subcommittee Document," ISA/SP50—1988-175, pp. 1-7, ISA Draft, 1988.
Table of Contents, Automation & Technology Department, 1995 (20 pages).
Table of Contents, Automation & Technology Department, 1993 (11 pages).
Table of Contents, Industrial Computing Society (no date), (8 pages).
Table of Contents, Proceedings of the Industrial Computing Conference, vol. 3, Sep. 19-24, Chicago, IL. Industrial Computing Society, 9 pages, 1993.
[Table of Contents], Proceedings of the 20th International Conference on Industrial Electronics Control and Instrumentation, vols. 1-3, Sep. 5-9, 1994, Bologna Italy.
[Table of Contents], Proceedings of the 7th Mediterranean Electrotechnical Conference, vol. 1, pp. 1-16, Apr. 12-14, 1994, Antalya Turkey.
Table of Contents, ISA/88, Houston, MA, 1988 (9 pages).
Table of Contents, ISA/89, 1989 (10 pages).
Tobin, D. "Southeast Paper Installs Largest Foxboro Distributed Control System," (no date), (3 pages).
"User Layer Structure," SP-50 Technical Report, 522 pages, Jul. 25, 1990.
"User Layer Technical Report," ISA/Sp50—1990-389C, ISA Draft, 24 pages, 1990.
Weinert, A., et al., "RT/OS—real-time programming and application environment for the COSY control system," Nuclear Instruments and Methods in Physics ResearchA, vol. 352, pp. 277-279, 1994.
WG1 List of Criteria (Appendix 1), ISA/SP50-1988-242, ISA Draft, 10 pages, Oct. 21, 1988.
Wood, G.G., "The Argus CONSUL System for On-Line Computer Control," Electrical Engineering Transactions, pp. 114-118, Mar. 1969.
Wood, G.G., "The challenge of Standards for Plant Communication," IFAC Distributed Computer Control Systems, pp. 191-192, 1982.
Wood, G.G., "Current Fieldbus activities," Computer Communications, vol. 11, No. 3, pp. 118-123, Jun. 1988.
Wood, G.G., "Data transmission, Processing and Presentation," pp. 46-54 (no date).
Wood, G.G., " Evolution of communication standards for the process industry," Measurement + Control, vol. 19, pp. 183-188, Jul./Aug. 1986.
Wood, G., "Fieldbus Status 1995," Computing Control & Engineering Journal, pp. 251+253, Dec. 1995.
Wood, G., "Generic link transactions for simple devices in fieldbus," ISA/SP50—1988—240, 6 pages, Sep. 20, 1988.
Wood, G.G., "Standardisation work for communication among distributed industrial computer control systems—A status report," INRIA, pp. 67-69, 1984.
Wood, G.G., "Survey of LANS and Standards," Computer Standards & Interfaces, vol. 6, pp. 27-36, 1987.
Wood, G.G., "Towards digital information control," Measurement + Control, vol. 21, pp. 179-180, Jul./Aug. 1988.
Stapleton, Nick, "802.3 Working Group DTE Power via MDI Call for Interest," 3Com, 15 pages, Jul., 1999.
"Plug-Compatible Controls and Actuators Speed System Development," News Release, Control Technology (US), Jan. 13, 1986 (Dialog Web Search Result).
"Disk Drive with Embedded Hyper-text Markup Language Server," IBM TDB, Dec. 1995.
Berge, Jonas, "Using Ethernet is a no-brainer," In Tech: The International Journal for Measurement and Control, pp. 36-39, Jul. 2000.
"Sun announces availability of Java™ Embedded Server 1.0," Press Release dated Oct. 1, 1998, downloaded from java.sun.com website.
"Company Profiles: What Users Need," Power, vol. 139, No. 6, p. 81, Jun. 1995.

* cited by examiner

*Primary Examiner*—Ramesh Patel
(74) *Attorney, Agent, or Firm*—David J. Powsner; Nutter McClennen & Fish LLP

(57) ABSTRACT

The invention provides improved methods and apparatus for control using field and control devices that provide a virtual machine environment and that communicate via an IP network. By way of non-limiting example, such field device can be an "intelligent" transmitter or actuator that includes a low power processor, along with a random access memory, a read-only memory, FlashRAM, and a sensor interface. The processor can execute a real-time operating system, as well as a Java virtual machine (JVM). Java byte code executes in the JVM to configure the field device to perform typical process control functions, e.g., for proportional integral derivative (PID) control and signal conditioning. Control networks can include a plurality of such field and control devices interconnected by an IP network, such as an Ethernet.

19 Claims, 6 Drawing Sheets

METHODS AND APPARATUS FOR CONTROL USING CONTROL DEVICES THAT PROVIDE A VIRTUAL MACHINE ENVIRONMENT AND THAT COMMUNICATE VIA AN IP NETWORK

This application is a continuation of Ser. No. 09/591,604, filed Jun. 9, 2000 now U.S. Pat. No. 6,788,980 entitled METHODS AND APPARATUS FOR CONTROL USING CONTROL DEVICES THAT PROVIDE A VIRTUAL MACHINE ENVIRONMENT AND THAT COMMUNICATE VIA AN IP NETWORK (the teachings of which are incorporated herein by reference), which claims the priority of the following United States Patent Applications: U.S. patent application Ser. No. 60/139,071, entitled OMNIBUS AND WEB CONTROL, filed Jun. 11, 1999; U.S. patent application Ser. No. 60/144,693, entitled OMNIBUS AND WEB CONTROL, filed Jul. 20, 1999; U.S. patent application Ser. No. 60/149,276, entitled METHODS AND APPARATUS FOR PROCESS CONTROL ("AUTOARCHITECTURE"), filed Aug. 17, 1999; U.S. patent application Ser. No. 09/345,215, entitled PROCESS CONTROL SYSTEM AND METHOD WITH IMPROVED DISTRIBUTION, INSTALLATION, AND VALIDATION OF COMPONENTS, filed Jun. 30, 1999.

BACKGROUND OF THE INVENTION

The invention pertains to control systems and, more particularly, to methods and apparatus for networking, configuring and operating field devices, controllers, consoles and other control devices.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor a device, process or system and automatically adjust its operational parameters. In other control systems, such apparatus monitor the device, process or system and display alarms or other indicia of its characteristics, leaving responsibility for adjustment to the operator.

Control is used in a number of fields. Process control, for example, is employed in the manufacturing sector for process, repetitive and discrete manufactures, though, it also has wide application in utility and other service industries. Environmental control finds application in residential, commercial, institutional and industrial settings, where temperature and other environmental factors must be properly maintained. Control is also used in articles of manufacture, from toasters to aircraft, to monitor and control device operation.

Modern day control systems typically include a combination of field devices, controllers, workstations and other more powerful digital data processing apparatus, the functions of which may overlap or be combined. Field devices include temperature, flow and other sensors that measure characteristics of the subject device, process or system. They also include valves and other actuators that mechanically, electrically, magnetically, or otherwise effect the desired control.

Controllers generate settings for the control devices based on measurements from sensor type field devices. Controller operation is typically based on a "control algorithm" that maintains a controlled system at a desired level, or drives it to that level, by minimizing differences between the values measured by the sensors and, for example, a setpoint defined by the operator.

Workstations, control stations and the like are typically used to configure and monitor the process as a whole. They are often also used to execute higher-levels of process control, e.g., coordinating groups of controllers and responding to alarm conditions occurring within them.

In a food processing plant, for example, a workstation coordinates controllers that actuate conveyors, valves, and the like, to transport soup stock and other ingredients to a processing vessel. The workstation also configures and monitors the controllers that maintain the contents of that vessel at a simmer or low boil. The latter operate, for example, by comparing measurements of vapor pressure in the processing vessel with a desired setpoint. If the vessel pressure is too low, the control algorithm may call for incrementally opening the heating gas valves, thereby, driving the pressure and boiling activity upwards. As the pressure approaches the desired setpoint, the algorithm requires incrementally leveling the valves to maintain the roil of the boil.

The field devices, controllers, workstations and other components that make up a process control system typically communicate over heterogeneous media. Field devices connect with controllers, for example, over dedicated "fieldbuses" operating under proprietary or industry-specific protocols. Examples of these are FoxCom(™), Profibus, ControlNet, ModBus, DeviceNet, among others. The controllers themselves may be connected to one another, as well as to workstations, via backplane or other proprietary high-speed dedicated buses, such as Nodebus(™). Communications among workstations and plant or enterprise-level processors may be via Ethernet networks or other Internet Protocol (IP) networks.

Control device manufacturers, individually, and the control industry, as a whole, have pushed for some uniformity among otherwise competing communication standards. The Foundation Fieldbus, for example, is the result of an industry-wide effort to define a uniform protocol for communications among processor-equipped (or "intelligent") field devices. Efforts such as this have been limited to specific segments of the control hierarchy (e.g., bus communications among field devices) and are typically hampered by technological changes that all to soon render the standards obsolete.

Still less uniform are the command and operation of control devices. Though field devices may function at the direction of controllers and controllers, in turn, at the direction of workstations (or other plant-level processors), proprietary mechanisms within the individual components determine how they perform their respective functions. Even the commands for invoking those functions may be manufacturer- or product-specific. Thus, the commands necessary to drive actuators of one manufacturer will differ from those of another. How the corresponding commands are processed internally within the actuators differ still more (though, hopefully, the results achieved are the same). The specific programming codes used to effect a given control algorithm likewise differs among competing makes, as do those of the higher-level control processors.

Industry efforts toward harmonization of software for command and operation of control devices have focused on editing languages that define process control algorithms. This is distinct from the codes used to effect those algorithms within control devices and, rather, concerns software "tools" available to users to specify the algorithms, e.g., editors including IEC-1131 standard languages such as Field Blocks, Sequential Function Charts (SFC), Ladder Logic and Structured Text.

Less concerted are industry moves to extend monitoring and limited configuration capabilities beyond in-plant consoles, e.g., to remote workstations. An example of this was the abortive Java for Distributed Control (JDC) effort, which proposed enabling in-plant workstations to serve web pages to remote Java bytecode-enabled client computers. The latter used the to web pages to monitor and set control parameters which the workstations, in turn, incorporated into their own control schemes.

An academic system along these same lines was suggested by the Mercury Project of the University of Southern California, proposing the use of a web browser to enable remote users to control a robotic arm via a server that controlled the arm. A related company-specific effort included that announced by Tribe Computer Works that allegedly enabled users to manage routers and remote access servers over IP networks using web browser software. See, "Tribe Defines Net Management Role For Web Browser Software," Network World, May 22, 1995, at p. 14.

Thus sets the stage for the present invention, an object of which is to provide improved methods and apparatus for networking, configuring and operating field devices, controllers, consoles and other control devices. A related object is to provide such methods and apparatus for process control.

Further objects of the invention are to provide such methods and apparatus as reduce the confusion, complexity and costs attendant to prior art control systems.

Related objects of the invention are to provide such methods and apparatus as can be implemented with commercial off the shelf hardware and software. Still further objects of the invention are to provide such methods and apparatus as achieve confusion-, complexity- and cost-reduction without hampering manufacturer creativity and without removing incentives to development of product differentiators.

SUMMARY OF THE INVENTION

The foregoing are among the objects attained by invention which provides, in one aspect, an improved field device for a process or other control system. The field device includes a virtual machine environment for executing Java byte code (or other such intermediate code) that, for example, configures the device to execute a control algorithm.

By way of non-limiting example, the field device can be an "intelligent" transmitter or actuator that includes a low power processor, along with a random access memory, a read-only memory, FlashRAM, and a sensor interface. The processor can execute a real-time operating system, as well as a Java virtual machine (JVM). Java byte code executes in the JVM to configure the field device to perform typical process control functions, e.g., for proportional integral derivative (PID) control and signal conditioning.

Further aspects of the invention provide a field device, such as a low-power intelligent actuator, that incorporates an embedded web server. This can be used to configure, monitor and/or maintain the device itself (as well as other elements of the control system) via a browser attached directly to the device or coupled to it over the network. To this end, the field device can incorporate a configuration editor, e.g., operating on a processor within the field device, that an end-user executes via the browser and web server.

Such a configuration editor can, in related aspects of the invention, be enabled or disabled depending on the environment in which it is used and more specifically, for example, the type of network in which it is incorporated. Thus, for example, the editor can be disabled when the field device is incorporated in a process control network that includes, e.g., an applications development environment suitable for configuration of the field device. Conversely, it can be enabled when the field device is incorporated in a network that lacks such a capability.

Still further aspects of the invention provide a field device as described above that includes an interface to an IP network, through which the device communicates with other elements of the control system The IP network can be, for example, an Ethernet network Moreover, it can be "powered," carrying electrical power as well as packets, datagrams, and other control or data signals. The field device, in related aspects of the invention, draws operational power, e.g., for its processor and other components, from such a network Yet further aspects of the invention provide a field device as described above that obtains configuration information and/or its network address from such an IP network upon start-up. To this end, on power-up or coupling to the network, the field device can supply an identifier (e.g., attained from a letterbug, assigned by a hub, or otherwise) to a DHCP or other server on the network. Once provided with an IP address, the field device can formally enter into the control network, e.g., by posting its characteristics to a network bulletin board, e.g., using a network enabler such as a Jini and/or JavaSpace server, or the like. Other network devices monitoring or notified via such a bulletin board can send configuration information to the field device or otherwise.

Still further aspects of the invention provide control devices, such as servers, control stations, operator consoles, personal computers, handheld computers, and the like, having attributes as described above. Such control devices can have other attributes, according to further aspects of the invention. Thus, by way of non-limiting example, they can provide web servers that collect process data from one or more control devices, generate source for operator displays, provide access to the control system, and host an applications development environment.

Still other aspects of the invention provide process, environmental, industrial and other control systems that comprise field and control devices as described above that are coupled via an IP network and, particularly, for example, by a powered IP network Additional aspects of the invention are directed to DHCP servers and network enablers (optionally, including web servers) for use in control systems as described above. Related aspects provide such servers and enablers as are embodied in solid state technologies, e.g., with no moving parts.

These and other aspects of the invention are evident in the attached drawings, and in the 5 description and claims that follow.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
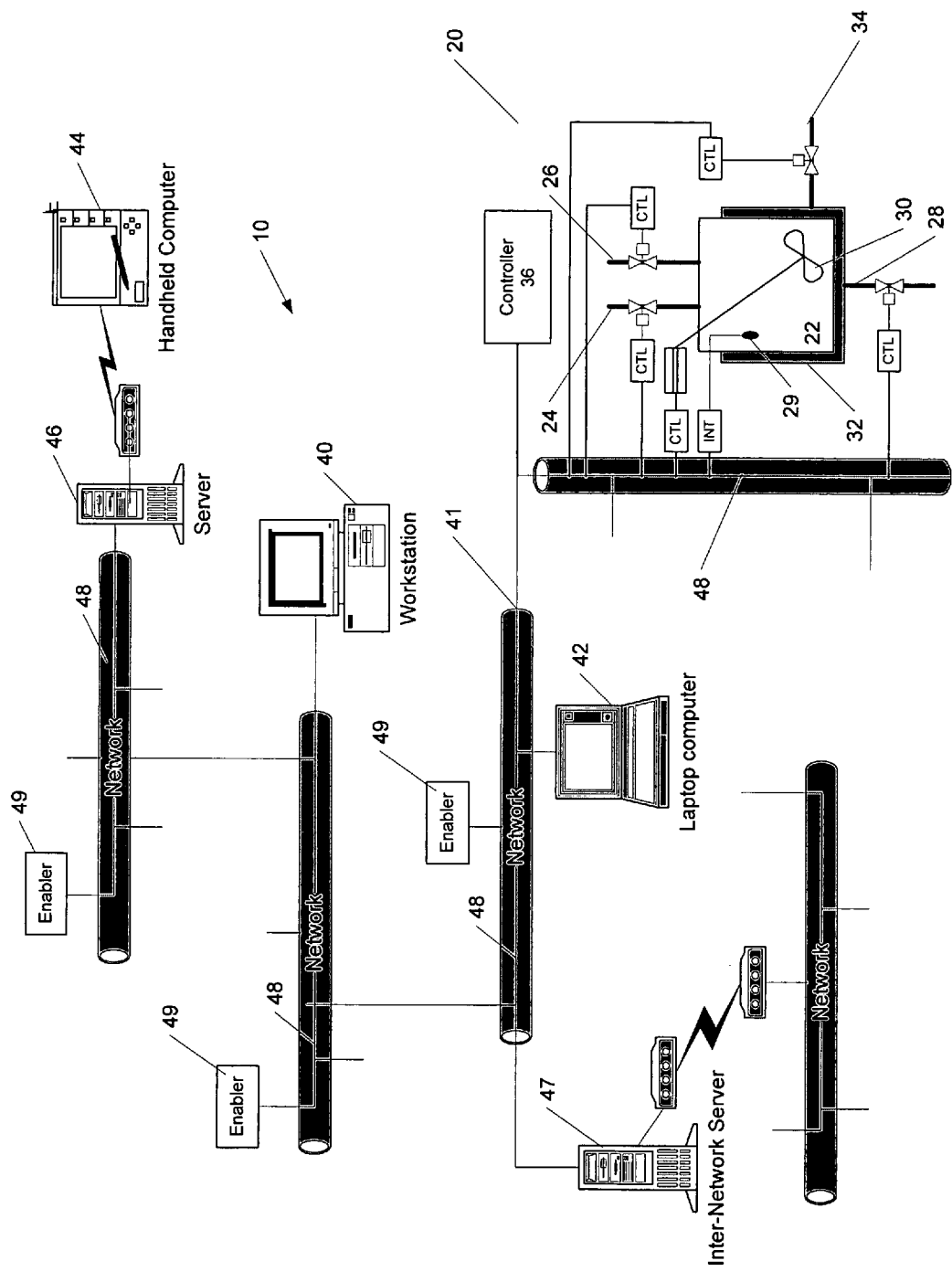
FIG. 1 depicts a process control system 10 according to one practice of the invention.

FIG. 1 depicts a process control system 10 according to the invention. The system includes networked control devices that monitor and control a hypothetical mixing process that utilizes mixing chamber 22, fluid inlets 24, 26, fluid outlet 28, paddle 30, cooler 32, and cooler inlet 34. Though illustrated and described below for use in connection with process control, those skilled in the art will appreciate that apparatus and methods according to the invention can be used in connection any industrial, manufacturing, service, environmental or other process, device or system amenable to monitoring or control (hereinafter, collectively, "control").

The networked control devices include actuators, such as the valves depicted as controlling inlets and outlets 24–28 and 34. A further actuator is shown controlling paddle 30. These and other actuators utilized by the control system are constructed and operated in the conventional manner, as modified in accord with the teachings hereof. The actuators operate under control of respective field device controllers, labeled CTL, that are also constructed and operated in the conventional manner to provide initialization, signal conditioning and communications functions.

Rather than using separate controllers CTL, the actuators can be of the intelligent variety and can include integral microprocessors or other digital data processing apparatus for control, initialization, signal conditioning, communications and other control-related functions. For sake of convenience, the label CTL is used regardless of whether the control-related functionality is integral to the actuators (e.g., as in the case of intelligent actuators) or otherwise.

Illustrated sensor 29 monitors a temperature, level or other characteristic of fluid in chamber 22. The sensor 29, as well as other sensing apparatus utilized by the system, are constructed and operated in the conventional manner known in the art, as modified in accord with the teachings hereof. They can be coupled to the control network via a transmitter or other interface device INT that, too, is constructed and operated in the conventional manner, as modified by the teachings hereof. The interface devices facilitate initialization, signal conditioning and communications between the sensors and the control system. As above, one or more sensors can be of the intelligent variety, incorporating integral microprocessors or other digital data processing capabilities for initialization, signal conditioning, communications and other control-related functions. Here, too, the label INT is used in reference to the control-related functionality, regardless of whether embodied in an intelligent transmitter or otherwise.

The networked control devices include one or more controllers 36 that monitor and control respective aspects of the hypothetical mixing process in the conventional manner, as modified in accord with the teachings hereof. The controllers can comprise mainframe computers, workstations, personal computers, special-purpose hardware or other digital data processing apparatus capable of performing conventional monitoring and control functions. Preferred controllers are constructed and operated in the manner of the CP control processors commercially available from the assignee hereof, as modified in accord with the teachings herein.

The control system 10 includes a variety of devices that serve as user interfaces and that provide configuration and/or control functions, all in the conventional manner as modified in accord with the teachings hereof Illustrated for these purposes are workstation 40, laptop computer 42 and handheld computer 44. These devices can provide configuration and control fictions directly, as in the case of workstation 40, or in cooperation with server devices, e.g., as in the case of handheld computer 44 and server 46. Apparatus 40–44 can couple with the control network directly, e.g., via bus or network connection, or indirectly, e.g., via satellite, wireless connection or modem connection.

The control devices 36–46, CTL and INT, collectively, referred to as "native" devices, are coupled for communications via a medium that permits at least selected ones of the devices to communicate with one another. To this end, in the illustrated embodiment those devices are coupled via one or more networks 48 that are, preferably, IP-based such as, by way non-limiting example, Ethernets. The network(s) can include, as indicated by the multiple segments shown in the drawing, multiple segments such as various wide and local area networks. They may also include high and/or low bandwidth components, such as phone lines, and low and/or high latency components, such as geosynchronous satellites networks.

Figure 2:
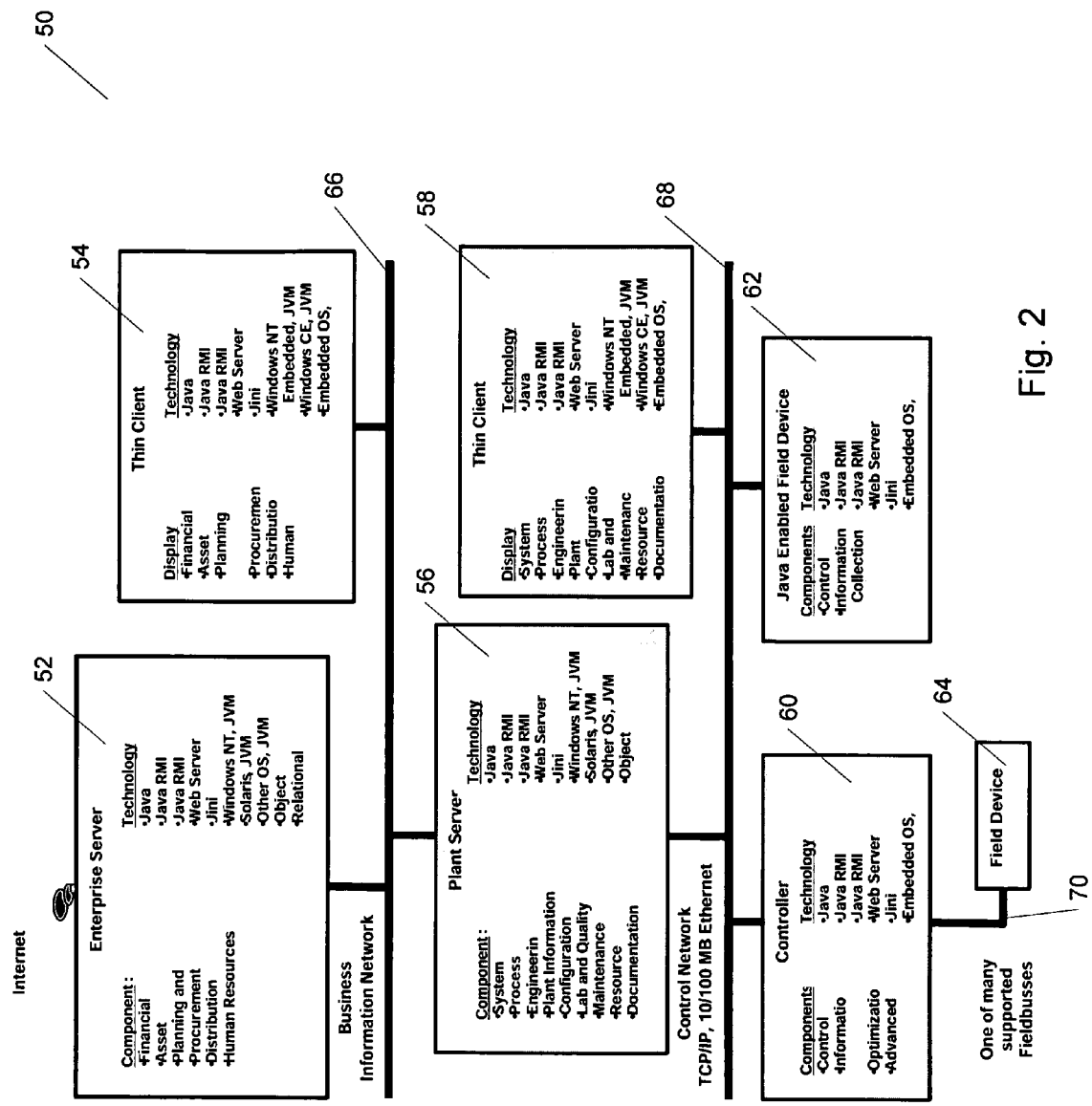
FIGS. 2 and 3 depict more particular embodiments of a control system of the type shown in FIG. 1.

FIG. 2 depicts a more particular embodiment of a control system 50 of the type shown in FIG. 1. The system includes an enterprise server 52, a first thin client 54, plant server 56, a second thin client 58, a controller 60, a Java-enabled field device 62, and one or more field devices 64, coupled to one another, e.g., in the manner illustrated, by one or more networks 66, 68.

Native enterprise server 52 (corresponding, by way of non-limiting example, to server 46) comprises a mainframe computer or engineering workstation that executes enterprise-level applications such as, by non-limiting example, those for financial, asset planning and procurement, distribution and/or human resources. In addition, it supports web serving, as well as optional object, relational and other database management systems. Server 52 executes Windows NT, Solaris or another conventional commercial or proprietary operating system. It is also equipped with a Java Virtual Machine (JVM), e.g., capable of executing Java virtual machine instructions (bytecodes), of performing remote method invocation (RMI), and of supporting Jini networking. The enterprise server 12 can be coupled to further networks, e.g., to the Internet, as shown, in any manner known in the art.

Native thin client 54 (corresponding, for example, to handheld computer 44) provides similar functionality as server 52, though its actual processing activity is limited to user input and output. Application processing, such as financial, asset planning and procurement, distribution and/ or human resources, are performed on behalf of client 54 by a server, such as server 52. The operating system and JVM fictions may be embedded in the conventional manner of a thin client. The thin client 54 is coupled to the enterprise server 52 over a business information network 66 (corresponding, for example, to network 48), typically, an Ethernet or other IP network, configured in a LAN, WAN or the like.

Native plant server 56 (corresponding, by way of non-limiting example to workstation 40) comprises a plant control console or engineering workstation modified in accord with the teachings hereof, executing plant-level control applications including system, process, engineering, plant information, configuration, lab quality, maintenance, resource and documentation applications of the type known in the art. Like enterprise server 52, plant server 56 can execute Windows NT, Solaris or other conventional operating systems. It is also preferably equipped to execute a Java Virtual Machine as described above. Plant server 56 is coupled to the enterprise server 52 and thin client 54 over the business information network 66.

Native thin client 58 provides similar functionality as server 56 though, again, relies on that (or another) server to perform most processing activity. As above, the operating system and JVM functions may be embedded in the conventional manner of a thin client. The thin client 58 is coupled to the plant server 56 over a control network 68 (corresponding, for example, to network 48), e.g., an Ethernet.

Native controller 60 (corresponding, for example, to controller 36) executes control algorithms to control associated non-native field devices 64, e.g., via any variety of commercial and/or proprietary field bus 70 hardware and protocols. Where processing resources are limited, the controller 60 utilizes a embedded operating system that supports web serving and the JVM. The controller 60 is coupled to the plant sever 66 and to the thin client 58 via control network 68.

Figure 3:
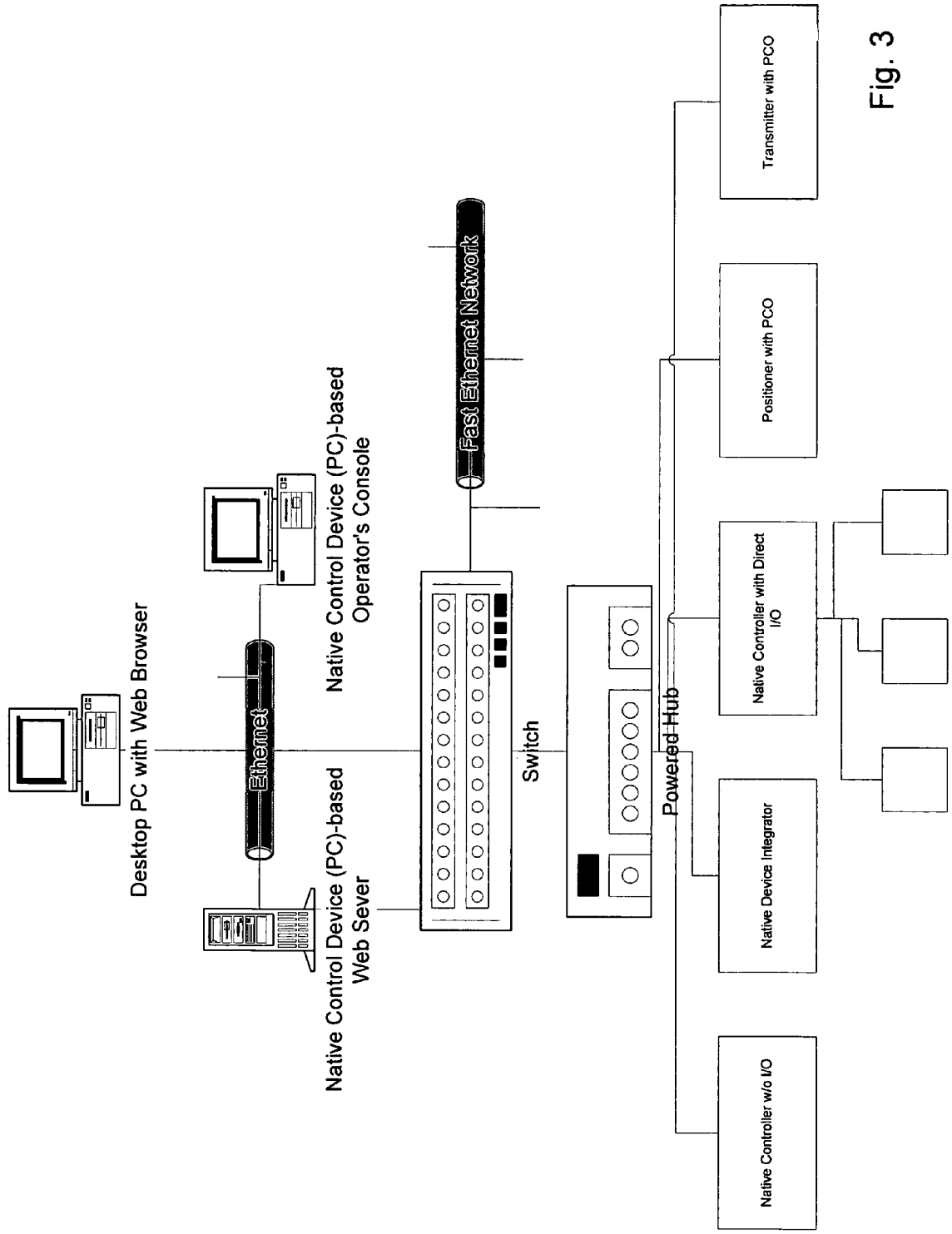
Figure 4:
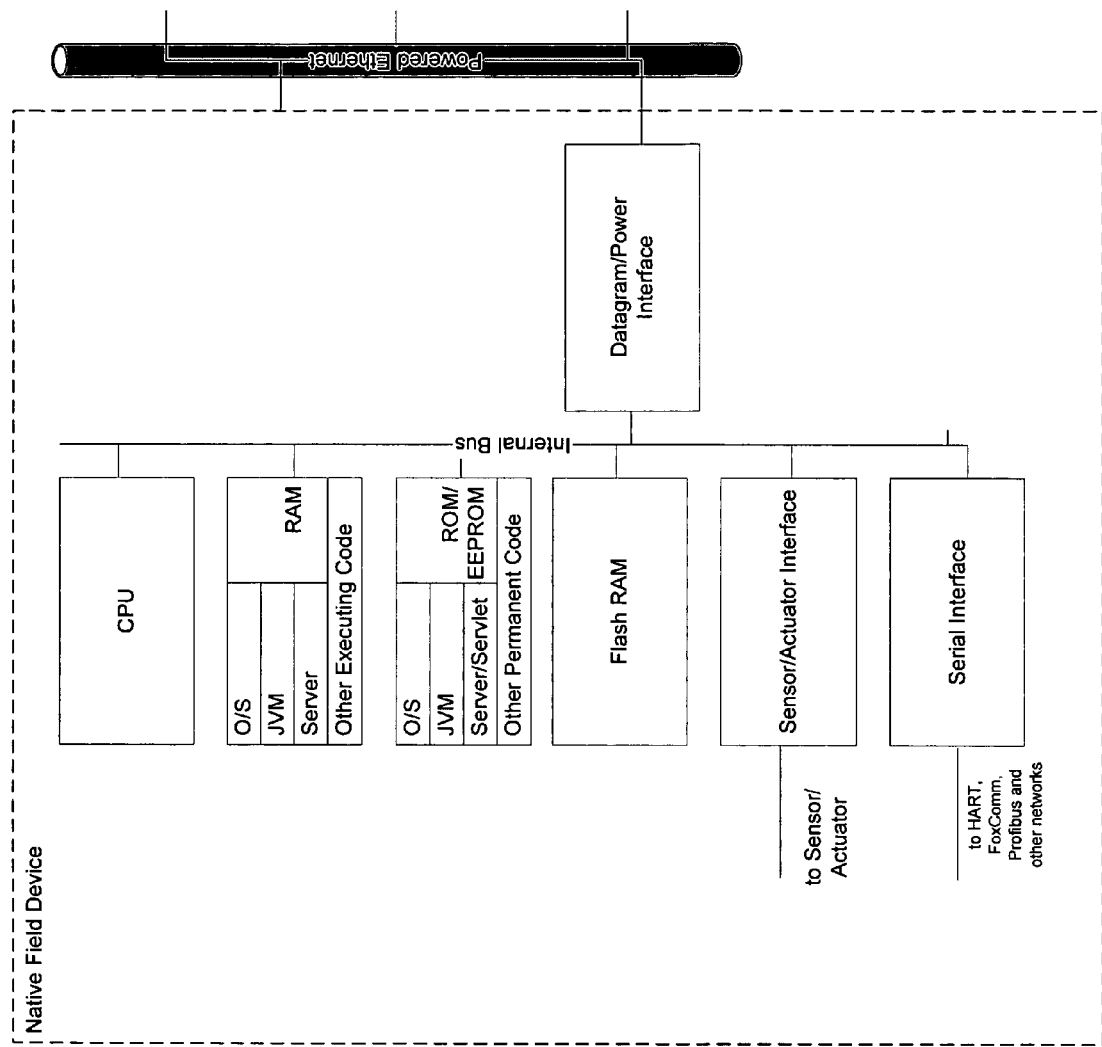
FIG. 4 depicts a native intelligent field device according to the invention.

Native field device 62 is a sensor, actuator or other field device. The illustrated device is of the intelligent variety, including processor (not shown) and operating system. It can be of the type commercially available in the marketplace, as modified in accord with the teachings hereof. The illustrated device supports web serving and JVM, as described above. The device 62 provides information collection and control functions, as illustrated FIG. 3 depicts another a more particular embodiment of a control system 50 of the type shown in FIG. 1.

Referring to FIG. 1, the illustrated control system 10, 50 uses web browsers, Java, Jini, JavaSpaces, TCP/IP and other technologies normally associated with the Internet and the world wide web to create a self-defining control network that minimizes complexity while emphasizing the portability and re-usability of the user's application. These technologies are advantageously employed to eliminate proprietary hardware and software to preserve the user's investments; eliminate network configuration and system management through self-configuring networks; increase the user's choice of algorithm suppliers by implementing control in Java; preserve the user's applications through hardware and system software changes through the use of Java and Web Browsers for process displays; minimize the wiring costs; reduce maintenance by making intelligent field devices a practical reality.

In addition to web technologies, the illustrated control system 10 uses an object location service, a commercial messaging service, and standard networking equipment, such as hubs, routers, network interface cards, where applicable. It also relies on common standards, where applicable, such as 802.3, Internet RFCs, the IEEE 1451 sensor standards. The system 10 supports a heterogeneous computing environment and utilizes industry standards (e.g., Microsoft standards) to provide communications between the native control components to the business and desktop environments.

1 Device Hardware 1.1 Platform-Defining Control Devices

In the illustrated embodiment, native control devices such as controllers 36, 60, workstation 40, servers 46, 52, 56 providing a platform for the control system typically include a central processing unit (CPU), memory (RAM), network support hardware, access to permanent storage, an operating system, and a Java Virtual Machine (JVM) including the TCP/IP suite. In addition, the devices include web server software, e.g., software of the type that serves graphical "web" pages in response to requests by other devices. Configurator software can be provided, as well, permitting each device to configure the-control system or selected portions of it. Those skilled in the art will appreciate that not all of these components need be included in all native control devices, e.g., some commercially available JVMs can serve as an OS themselves.

Process control object (PCO) software provided on the platform-defining control devices comprise a collection of data and methods implemented in Java and executed on the native control devices' JVMs to perform typical process control functions, by way of non-limiting example, signal conditioning and PID control. Likewise, station management object (SMO) software on the devices comprise data and methods that allow the device to report its health, performance, and other status information in a uniform manner. The SMO software can implement SNMP or the equivalent Java functionality.

Software is also provided on the platform-defining controls devices for messaging services for data transfer and alarm/event notification, as well as software comprising system management pages. Each control device may include additional software, of course, depending on its functionality.

1.2 Field Devices

Native intelligent field devices typically include a low power CPU, e.g., a NetARM or Java Chip; a real-time OS like VxWorks, QNX, PSOS; RAM; FlashRAM to serve as permanent storage; ROM/EEPROM to serve as the home for the OS and other permanent software; an Ethernet interface; power from the Ethernet interface (in the event a powered Ethernet network or hub is used) or otherwise; a sensor interface, e.g., IEEE 1451.1 and 1451.2; JVM; a web server, and a device specific configurator servlet. A field device so constructed can be configured and monitored via a lightweight web browser, e.g., handheld computer 44, coupled to the device over the network 48.

The field devices can include serial interfaces to allow the attachment of these devices to HART, FoxComm, Profibus and other networks operating under a protocol different from that of network 48. Combined with appropriate software, these devices provide the user with a single transmitter suitable for use on any field network.

Figure 5:
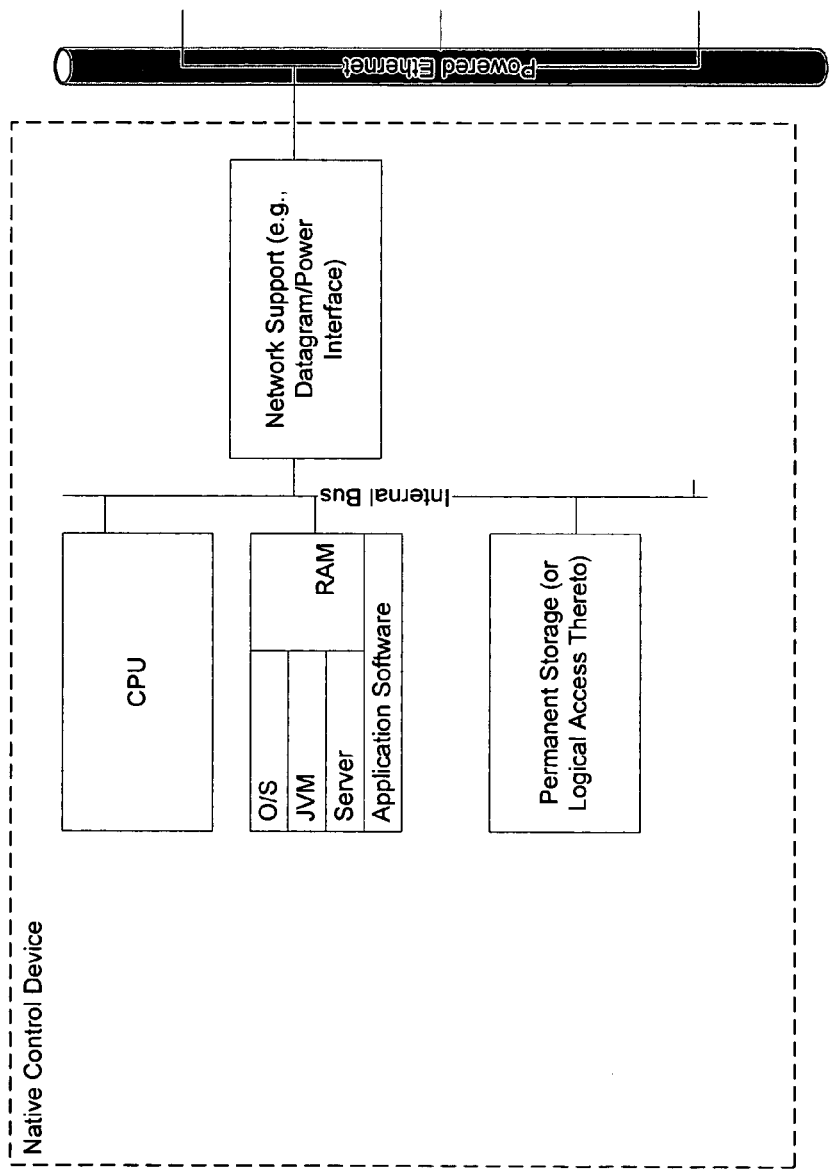
FIG. 5 depicts a native control device according to the invention.

One configuration of a native intelligent field device including the elements described above these elements is shown in FIG. 5. Those skilled in the art will appreciate that other configurations can be realized, as well, in accord with the teachings hereof.

1.2.1 Stoic Sensors

The control system 10 can include one or more stoic sensors, not illustrated, that constitute minimal sensing elements. Typically, these are simply silicon chips that are packaged to allow them to sense the process environment and that have only enough electronics to relay measurements to a pair of wires that carry the raw signal to another device for processing. Some stoic sensors generate a signal without external power; others require some excitation. In a preferred embodiment, native devices 36–46, CTL and INT according to the invention support the attachment of many stoic sensors.

1.2.2 I/O

1.2.2.1 Overview

Some I/O devices, e.g., thermocouples, RTDs and analog transmitters, may not use a transmitter compatible with the network 48 but, rather, send raw sensor output to a multiplexor for processing. To accommodate these devices, the system 10 includes two types of intelligent I/O cards: network I/O cards supporting IP and an API, and native I/O cards that support the protocol of network 48 (i.e., the "native" protocol) directly.

Network I/O cards are coupled directly to network 48. Native control devices are IP enabled and support the proprietary API of the cards, thereby, permitting reading and writing of their I/O registers. The cards' respective APIs support retrieval of data in several formats (raw counts, linearized counts, engineering units, etc.), as well as the assignment of simple configuration information to those registers, if the device supports such functions. To this end, the native devices utilize I/O classes that corresponding to the native I/O protocols. Redundant I/O devices can be physically interfaced transparently through a single I/O card or through multiple independent network I/O cards. Logically, PCOs support at least the use of multiple independent cards. Alternative I/O features may be used in addition. Native I/O cards are substantially similar to native-enabled transmitters, except for packaging and scale. These I/O cards may be considered as small multi-loop controllers or multiplexors.

1.2.2.2 Foreign Device Integration

Networked I/O cards are utilized with devices that cannot otherwise directly interface with the network 48. The cards, in this case, provide an interface that permits at least reading and writing of relevant device values, which can be stored internally to the card and accessed via its API. Foreign devices that are control systems in its own right typically maintain objects or other data structures representing process values and associated data. A preferred interface to these "devices" are through objects that wrap the foreign function blocks with the services expected of native devices, e.g., detail displays and configurators, which are accessed in exactly the same manner as native ones of those same services. For example, a name service is be able to locate foreign blocks and the native API of system 10 permits querying those blocks for values.

1.3 Native Controllers

In a preferred embodiment, all native devices may be used as controllers, though, dedicated I/O-less native controllers, such as controllers 36 and 60, are typically required for unit-wide operations. Thus, for example, control can also be provided by personal computers, workstations and servers of the type shown as elements 40, 42, 46, in FIG. 1. Native controllers, e.g., 36, 60 are of the same general design as native boards used in the transmitters and actuators. However, they support a faster CPU clock cycle and more memory (volatile and non-volatile) than their smaller siblings. High performance native controllers have a still more powerful CPU, more RAM, and maybe a removable FlashRAM card for bulk storage and backup. Like the native transmitters and actuators, these native controllers can receive power from a powered Ethernet connection or otherwise. Native controllers can be used in redundant and non-redundant configurations. Since the I/O is independent of the native controller, redundancy can be implemented in a number of manners, e.g., hardware fault-tolerance or transaction based synchronization between stations with clustering.

1.4 Native Compliant Workstations

Native workstations, e.g., such as element 40, can be constitute web browser-enabled devices that communicate with web servers, such as element 46, that actually collect the process data from other native devices. In addition, the workstations can consist of a flat panel display, OS and web browser in ROM (or on a memory card), web page (process graphic) database/cache, connections for optional annunciator keyboards, option for wireless Ethernet, and, optional, battery operation. Data supporting the operator interface comes from native devices directly.

1.5 Native Web Server

If a generic web browser-enabled device is the operator's console, a native web server, such as servers 46, 52, 56 sources the operator displays. This can be implemented with redundancy using technologies NT's clustering capabilities, or the like. Additionally, a native web server provides access to a illustrated control system 10 to users not physically attached to the illustrated control system 10, e.g., as illustrated with respect to elements 44 and 46 of FIG. 1. In this mode, it centralizes data requests to maximize efficient use of communication resources.

1.6 Native Enablers 1.6.1 The illustrated control system 1 includes native enablers 49, such as Jini and JavaSpaces devices and Solid-State DHCP servers. These enablers, which are optionally redundant, are preferably fully solid state with persistent memories. They do not use batteries for their persistent memory, though they may well plug into a wall outlet for power in non-industrial environments. The Jini and JavaSpaces serve as community "bulletin boards." These are used to notify system monitors that native devices have been added to or removed from the system The system monitors respond to such notices by triggering appropriate actions.

The illustrated control system 10 assumes that each native device is able to acquire an IP address when it comes on-line. To minimize configuration, a DHCP server, illustrated for example by element 49, is required to furnish these addresses. To ensure maximum availability of this critical server, it is preferably a solid-state device and, optionally, includes a redundant partner DHCP Server. A particular native DHCP server provides addresses for a portion of the network 48. It obtains its configuration by notifying the system 10 that it has come on line.

Those skilled in the art will, of course, appreciate that IP addresses can be selected by mechanisms other than DHCP servers.

1.6.2 Native Internetwork Server

An internetwork server 47 is used to link separate control systems networks 48. It provides a platform for inter-network communications, controlled access to data, name conflict resolution, and other services need to efficiently, securely, and transparently accomplish the connection of one or more illustrated control systems to another.

2 SubSystems

2.1 Software Downloads

The illustrated system permits the electronic downloading of software and/or licenses for execution on the native devices. This includes native software objects, updates and/or licenses for same. To ensure proper operation of the process facility even in the event of insufficient licenses, downloaded software registers with the system monitor and declares whether or not it is licensed. In the case of insufficient licensing, the system monitor's notifies the customer appropriately.

In instances where appropriate native software modules and authorizations are in place, the system 10 can access a download site, e.g., an Internet e-commerce site, and determines if updates are available. If so, it notifies the user and invites him/her to request downloading of the upgrade. Such an e-commerce or other web site can also provide configuration tools that allow the user to design, implement, and test a new PCO block. This allows the user to access complex and/or rapidly improving software tools without having to maintain them locally. For this purpose, the use is charged, e.g., a modest access fee.

2.2 Security

The system 10 includes a native security system to control access to managed objects based on the type of access, e.g., (i) extra-network, i.e., users who are accessing the illustrated control system 10 from a non-native station; (ii) inter-network, i.e., users who are operating from a native workstation on a different physical native network; and (iii) intra-network, i.e., users who are operating from a native workstation within the particular native network.

Secured extra-system access is provided through a native secure web server, e.g., server 46, that permits dial-up, network, and other remote access and that supplies and defines the permitted extra-network access, including the API available to applications hosted outside the network or on the server. See, for example, elements 44 and 46 of FIG. 1. Access is controlled by user name, by user location (IP address or workstation name depending on the network), and by the type of the targeted object.

Inter-system access is provided by a gateway device, such as server 47, that permits the secure transfer of data. This device negotiates secure access, deals with name conflicts between systems, and provides support for various physical media A pair of such devices are provided to account for situations where the source is local to the sink. In a preferred system, the server 47 or other gateway encrypts the data so that others cannot read it. Likewise, it authenticates message sources to verify that they are coming from a matching device. A preferred gateway minimizes the number of packet transfers so as to minimize delays over slow or high latency links.

Secured intra-system access is controlled based on the user and the workstation, leveraging the Java security model and other security models to the extent possible. The native security system authenticates users, e.g., regardless of whether they are attempting access from operator's console or via an application program.

The native security system manages access to objects, including PCO attributes (i.e., variables and/or parameters of PCOs), system monitors, and native messages. It allows applications to add objects to the list of managed objects. Read and write access is preferably controlled separately, i.e., as if a single PCO attribute was two separate objects.

The security model is based on a lock and key approach. Each PCO attribute, for example, is assigned to one of a large number of locks. The user is given different keys for read and write access to object attributes. This key may be modified according to the type of native workstation used for access. The key is passed to the object attribute when the object attribute is accessed. If the access is a connection, it need be passed only once. The object attribute compares the key to its lock and allow or deny access as appropriate.

A software tool is supplied with the applications development environment (ADE) or configurator that allows identification of users; access points allowed by the user; object attribute groups accessible to the user; and access type (read or write) to the object types. The object attribute groups define collections of object attributes via similar security access guidelines, e.g., alarm limits might be in one group and tuning parameters might be in another. The security model is embedded in the APIs providing access to the secured objects. This assures that that access is granted only after the native security system has performed the necessary verifications.

2.3 Maintenance and Support

The illustrated control system 10 supports the on-line upgrade of all application software from remote and local workstations. Application software, for purposes of this discussion, includes the system monitor, PCOs, and other Java-based code. Native diagnostic and maintenance tools work over user-supplied or other IP-based networks, providing that they allow services such as the world wide web to operate over them to external sites. For networks that do not permit this, the illustrated control system 10 provides modules that support direct connections to a native support center via dialup analog phone lines, and dialup high speed lines, e.g., ISDN and ADSL. Native maintenance, including software updates, operate over these connections; hence, it is not necessary for a person to be physically present to update system or application software.

The illustrated control system 10 includes diagnostics to track problems from the hardware upwards. Maintenance staff can run in parallel diagnostic versions of the software. Such software running in open loop or switched into operation as necessary is believed particularly advantageous for support purposes.

2.4 Configuration

An application development environment (ADE) coordinates configuration in the illustrated control system 10, e.g., except for devices (such as certain transmitters and positioners) where use of an ADE is not advantageous and for which internal configuration is preferred. Characteristics of the ADE are its use in configuring/building control applications including control schemes, displays, historians, etc.; support of multiple simultaneous users; support of remote, concurrent development; support of change tracking and change management including task based activity traces, summary reports, change annotation, approval cycles, and user identification; a human interface component that runs in any web browser coupled to the system; a server component that runs on any user-supplied system; permanent storage comprising a commercial database for which a JDBC implementation is available; allowing the definition of configuration object templates; allowing the instantiation of configuration object templates into configuration objects; allowing the user to add and remove editors for configuration object components in real-time; limiting the user's access to configuration capabilities in the various pieces of equipment; and supporting application distribution along with verification of download permissions.

With respect to the support of multiple simultaneous users, system editors provide object-based "check-out" and "check-in." No other user is allowed to edit a checked-out object or any of the objects that it contains. As an alternative, editors support the concept of task-based configuration activities and the related "check-out" and "check-in" facilities required to make it work. When an object is checked out, it is assigned to a task. Objects are not checked back in, tasks are. A build manager has the responsibility of integrating the tasks.

The native ADE delivers lower engineering and maintenance costs through the unification of application development, preservation of application expertise, reduction of application development effort, and the deployment of developed applications. Is it based on industry standards (e.g., IEC 1131 and IEC 1499) to preserve the user's investment in training and applications. It also produces appropriately formatted Java class for execution in native devices. Since the native ADE produces output that can be read and loaded into a JVM and since the native control devices include JVM, one control configurator can configure all native devices.

In a preferred embodiment, the ADE imports configurations from legacy systems; supports the use of third-party control algorithms; and supports both bulk building of control configurations and on-line changes with validation.

Configuration is not limited to implementation on a web browser, though this can be advantageous since it allows configuration from many types of device without installation of special software, i.e., it provides a thin-client configuration mechanism. For device configuration, there are two cases: a device used in illustrated control system 10 and a device used outside illustrated control system 10. For devices used outside illustrated control system 10, the configurator is placed in the device so that it can be configured even without the native ADE. This on-board configurator allows the device to be configured for use with Profibus, Foundation Fieldbus, on 4–20 ma wires, and other industry-standard or proprietary networks. For devices used in the native environment, (i) a copy of the configurator is available from a native web server for off-line configuration and download, and (ii) the on-board configurator is disabled to prevent changes in the configuration except through the ADE.

2.5 Human Interface

The illustrated system's primary human interface (HI) device is a web browser. The current range of devices executing these spans cellular phones to mainframe computers. The native HI is multilingual, i.e., it supports the presentation of information in a default language and one or more secondary languages simultaneously. All standard native applications support text substitution based on the currently selected language. Error messages are likewise in the currently selected language.

2.6 Process Control

Process Control is implemented using process control objects (PCOs) running in an execution environment consisting of a JVM and any associated applications required to load and execute the specified control strategies. Control strategies are specified in terms of PCO composites. PCOs are Java classes designed to be modular and easily upgraded even during operation. The native PCO configurator, from a high level view, creates instances of these classes, connects them as necessary, and installs them in particular devices.

Process control objects consist of two user-available types: blocks and composites. PCO blocks are, from the user's point of view, similar to conventional function blocks. Likewise, composites are similar to conventional collections of function blocks. Distinguishing external features of PCOs include the fact that changes involve the addition/deletion of PCOs and cause new versions to be loaded into the targeted native device. The new version runs in parallel with the old version until the engineer decides that it is operating properly and "swaps" the control from old to new.

Composite PCOs may span stations transparently. PCOs are bound to stations very late in the configuration process and may be migrated from one station to another at any time. Further, PCOs from different sources may operate in the same device if the configurator supports the use of multiple PCO libraries.

A native PCO configurator supports multiple libraries of PCOs from multiple vendors; permits the creation of composite PCOs from other PCOs; permits the use of composite PCOs as templates, with a composite PCO definition specifying which fields is altered in a template; permits the assignment of PCOs to physical devices; provides IEC 1131/1499 influenced view of the configuration process, i.e., support for Logic Diagrams, Structured Text, Sequential Function Charts, Function Blocks, and PCOs, while producing Java byte code as its output.

The creation of composites includes the raising of internal (deeply buried) names to the top level of the composite PCO. For example, a cascaded Temperature/Flow loop might have the temperature and flow measurements referenced as TC_CASCADE:PRIMARYFLOW and TC_CASCADE:SECONDARYFLOW or as the longer fully qualified name. The configurator works both off-line in a bulk creation mode and on-line in an individual correction mode.

2.7 Communications: Object Location, Message Transfer, and Data Transfer

The concepts of object location and data/message transfer are closely bound. A process control system imposes significant quality of service requirements on any services used to locate objects of interest and to acquire values from or make changes to those objects. The illustrated system includes an object location and data transfer service that provides a communication model definition, security, object location services, network types requiring support, quality of service, APIs (Java and non-Java), maintenance and upgrade strategy, and interoperability with existing control systems. In addition, the communications system addresses the particular needs of process data transfer.

2.8 Critical Applications 2.8.1 Time Synchronization

The illustrated control system 10 supports time synchronization to the millisecond in each station on the network 46. Where equipment configuration renders this impossible, time synchronization to 50 ms is provided.

2.8.2 Alarm and Message Management

The illustrated control system 10 provides a facility that centralizes viewing, recording, organizing, and categorizing the messages generated by the system monitor, the operator action journals, the PCOs, and other systems that record textual information. This application is the basis for alarm management strategies including inferential alarming and alarm prediction. However, the message management facility is not in and of itself an alarm historian Rather, it relies on a native historian to provide the long-term storage of this information.

2.8.3 Historian

The native historian provides the fundamental data collection, reduction, and archival services. The data collected includes process values and messages from various applications within the illustrated control system 10. In addition, it provides historical data in support of several other common applications—typically known as plant information management system (PIMS) programs and trend window support. The historian is capable of exporting its data to user-selected databases.

2.8.4 Plant Information Management System

These applications include a simple and easy to report writing facility, a calculation facility that can use historical and real-time data to compute new values, and a desktop visualization system that uses the historians data instead of real-time data. The desktop visualization system uses the native graphics capabilities to connect the graphics to the historian and to allow the operator to "move" the entire graphic backwards and forwards through the historical data. The values calculated by the calculation facility are stored in PCOs that represent the data and generate appropriate alarms. The report writing facility supports shift reports with calendar adjustments as a simple to use feature. In addition, it facilitates the definition of ad-hoc reports using a page layout metaphor.

3 Interoperablity

Interoperability of the illustrated control system 10 with legacy process control systems can be facilitated by adding a networked I/O module to the I/O chain of existing I/O cards, adding a native device integrator to talk to other networks of devices, or utilizing a native API for Microsoft- and Solaris-based applications.

4 Operating the Control System

4.1 System Startup and Management

4.1.1 Device Identification

Each native device is assigned a name that is used to identify the device and obtain any configuration information that it needs. Embodiments of the invention use alternate approaches to identifying a device, including using a hub that is configured by the user to assign a name to each of its ports, e.g., using letterbug or software configuration; installing a letterbug, e.g., on the workshop bench, which tells the device its name; -using a PC or handheld computer, e.g., on the workshop bench, to give the device its name; or using soft letterbugs.

4.1.2 Address Acquisition

After a native device has its name, it acquires its IP address from its environment. The illustrated embodiment uses DHCP for this purpose. Preferably, the DHCP server is a native device, such as enabler 49, though other DHCP servers can be used, as well.

4.1.3 Registration of the Device

Once the device knows its address, it registers its characteristics on a native bulletin board, which can be colocated with the DHCP server, e.g., in an enabler 49. Typically, many software services in the system 10 register with the bulletin board for notification of additions of native devices. Upon registration of a device, these services are notified and enter into relationships, if any, with the new device. A typical situation would involve notifying a system monitor process that a native device is active. That process then updates its web page with information about this device. In a preferred embodiment that utilizes a hierarchical network, each bulletin board is covers a given "territory" or region of the network

4.1.4 Configuration Acquisition

If a device is unconfigured, it marks the "Configured" attribute on its bulletin board entry as "False". Any system monitor receiving device notifications to this effect generates an alert. Once a device has its name, it is able to communicate with any networked supply of non-volatile storage. This is particularly useful in the case of devices with limited in device non-volatile storage, whom a system configuration utility notifies of the location of configuration information. Devices that can retain all of their configuration information can start up using that configuration. Actions taken during start-up, e.g., taking PM algorithms out of hold, are configurable.

4.1.5 System Monitors

A system monitor monitors the health of system components (hardware and software), monitors the health and operation of user applications, provides configuration information to devices that request it, and monitors the licensing of software and upgrades for purposes of alerting the appropriate groups. The system monitor supports standard SNMP agents and any native specific system management protocols.

The predominant source of information used by the system monitors are the bulletin boards which, as noted above, are used by the native devices to record their current state of operation. As devices are added and removed from the bulletin boards, the system monitor displays that information. The information posted on the bulletin boards includes diagnostic information. A system monitor not only displays this information but also allows the user to access and operate any embedded diagnostic displays and operations.

4.2 Device Configuration and Management

4.2.1 Device Startup

Initial start-up of a native device involves the following steps:
1) Install the device on the network 48 and turn on the power as required by the device.
2) The device obtains an IP address from a DHCP server 49 on the network 48.
3) The device registers with the native name service.
4) The device waits for a configuration.
5) The device is now ready for configuration.

Restart of a native device is effected by the steps of
1) Install the device on the network 48 and turn on the power.
2) The device obtains an IP address from a DHCP server on the network.
3) The device registers with the bulletin board.
4) The device begins operation according the configuration stored in its non-volatile RAM. This RAM may be a network resource that it must recover. If that resource is unavailable, the device is essentially unconfigured and the above procedure is followed.
5) The device is now ready for configuration and operation.

4.2.2 On-Line Configuration

The steps involved in on-line native device configuration are:
1) The engineer starts a web browser on workstation 40, handheld computer 44 (wireless or otherwise), a PC, a native workstation, etc.
2) The default home page on the browser is cached and contains an applet that locates the native bulletin board and raises the initial web page that lists the services available from that workstation.
3) The engineer selects the ADE and a native device of interest.

If the device is on a native network 48, the native configurator (ADE) is used to make the changes. In this case, the web browser is pointed at the web server that hosts the ADE. This approach eliminates conflicts between field change and database changes. The configuration of non-native devices is provided by a service that encapsulates the native commands and passes them through a native device to the actual foreign device.

The steps in PCO configuration are

1) As in the off-line mode, the engineer accesses the ADE and makes necessary changes.
2) Once the changes are complete, the engineer tells the new objects to begin execution in "open loop" mode, i.e., their outputs are not allowed to go to the field or to any other display station other than the one used to configure them. (For examples, their names are not registered with the native name service.)
3) In the open loop mode, the engineer can "Verify and Validate" his new control scheme by viewing the detail displays for the new and the old objects "in parallel". The set of available detail displays may include special displays for evaluation of parallel composites.
4) Once the configuration is complete, the device records its new configuration in its local non-volatile RAM. Optionally, it updates a remote configuration database or just set a "changed configuration" status indicator much like conventional intelligent transmitters.

5 Native Software Subsystems 5.1 Security 5.1.1 Object Access 5.1.1.1 Locks and Keys As noted above, the proposed security mechanism is a lock and key. In this model, the attributes of an object that are available to be manipulated are assigned a lock number. An application registers with the security system at start-up to obtain a key. The value of the key depends on the effective user id (name) and the station on which the application is running. The key is never visible to the user, so he/she cannot alter it. This key is available to any library that uses the security system to ensure proper access.

5.1.1.2 Security Database

A security database contains a list of users. For each user it allows the specification of a master key, i.e., a bit array with a bit set for each lock the user is allowed to unlock. There is one master key for each object type supported by the security system. By default, the security system supports the creation of master keys for the system monitor, process data (PCO attributes), and native messages (events). The database also allows modifications to the master key for a user based on the station used to perform an operation. These exceptions can be expressed as IP addresses, station names, or by the type of access being used (e.g., extra-system, inter-system, or intra-system).

5.1.1.3 Operation

The security system supports caching the security system database on specific servers to improve redundant operation and to speed key queries. This is generally not a significant issue since the query is done once per application. Each time an operation is attempted or, in some circumstances, once per connection, the key is passed to the target object along with any other information required by the object to achieve the user's request. It is the responsibility of the object to match a bit in the key with the lock on the attribute or method being altered. If there is a match, the operation proceeds. If the match fails, the operation is aborted and the calling application is notified of the failure. If the lock is zero, the operation is allowed to continue.

5.1.1.4 Use

According to a preferred practice, the illustrated control system 10 supports at least 256 individual locks. This allows the application engineer to define 255 groups of objects for each type of object being accessed.

5.1.1.5 Impact on PCOs and Other System Components

The value record of a PCO attribute includes two keys: one for read access and one for write access. A default value for the key can be inherited according to rules concerning the use of the attribute, e.g., all alarm attributes have an assigned group by default. A system monitor interface implements the same mechanism.

5.2 Maintenance and Support 5.3 Configuration

A configuration object (CO) is a collection of objects plus the editor used to manipulate them. A Configuration Object Template (COT) is a CO that has not been instantiated. The application development environment (ADE) is the environment for configuration object editors. It shows the user the existing COs in the CO being edited and a list of available templates. It provides the mechanism for adding objects to a CO by instantiating a COT and for removing COs. A Configuration Object Component (COC) is any of the objects found in a Configuration Object. Typical components are: PCOs, Process Graphics, Reports, Historian Configuration Objects, etc. The ADE has two components: the human interface and the server. Several human interfaces can access the same server at any time.

When a Native device is placed on-line, its internal configuration services are disabled. All configuration instructions come from the application development environment. Where on-line configuration is permitted, the system monitor or other system component flags any configuration mismatches.

Invoking the ADE is tantamount to starting the editor of a particular top-level CO. The ADE presents all of the available COs within the selected CO and all of the available COTs. The ADE provides a mechanism for manipulating those objects and for adding new objects by instantiating COTs. Since the objects within the ADE are also Configuration Objects, i.e., they are themselves collections of objects with associated editors, configuration involves selecting an object, invoking its editor, and making changes. Each editor knows how to store its object's data in the persistent storage.

The ADE preferably includes a system editor, a control editor, a graphic editor, a message manager editor, a historian editor. All editors support the use and creation of templates by the user. The also support the assignment of their objects to particular stations in the native network. Not all objects require assignment, but the editors are responsible for it.

5.3.1 System Editor

The system editor allows the user to configure a logical arrangement of native device objects. The only devices it configures are those that are native-enabled. If a device, such as Networked I/O, does not support Native, this editor is not interested in it. The following table lists those devices, what they do, and what needs to be configured.

| Device Type | Description | System Editor Configured Attributes |
|---|---|---|
| DHCP/Bullet in Board Server | These devices allocate IP addresses to stations and act as the bulletin board for the stations that ask for addresses. They are not configured to know what devices might be attached. | Name and association with a Web Server |
| Native Controllers | These devices act as PCO platforms. | Name and association with a DHCP/bulletin board Server (which may be a Web Server) |
| Native Workstations | The devices that supply the human interface to the process. | Name and association with a DHCP/bulletin board Server (which may be a Web Server) |
| Native Web Servers | This devices host Native Applications and graphics. Native Workstations may also be Web Servers. | Name |

As with the other editors, the system editor is object oriented and template driven. The user is allowed to select an object type from a palette and attach it to the appropriate stations. Individual Device Editors are provided for each of the device types.

5.3.1.1 DHCP/Bulletin Board Editor

If the device is assigned to another DHCP/bulletin board device or a web server, the editor allows the user to specify the number of IP addresses that this device needs to be able to supply below it. In this case, when the device starts up, it gets its own IP address and IP address range from the Web Server or DHCP/bulletin board device to which it is assigned. If it is not assigned to such a device, the editor allows a range of IP addresses to be assigned to it. It is assumed that the device gets its own IP address from another, non-Native DHCP Server.

5.3.1.2 Native PCO platforms

Each device type on the network is provided a specific editor to control its specific configuration. Typical devices are: transmitters, actuators, controllers, etc. These editors are available for off-line configuration. In this case, the system monitor downloads any approved configurations at the next start-up. The editors may also be available on-board the device (e.g., for fixed function devices such as single station controllers), which allows direct configuration through a web browser. The on-board facility is automatically disabled once the device is placed on a native network. This ensures database consistency while allowing the use of the device on non-native networks. In the illustrated embodiment, device specific configurators are provide in ADE add-in and on-board, preferably, with the same code would be available and used for both.

5.3.1.3 Native Workstations

The configuration of this device includes user name(s) allowed; read only operation; full fledged operator, and so forth.

5.3.1.4 Native Server

The configuration of this station is a range of addresses if it is acting as a DHCP server.

5.3.2 The Control Editor

The Control Editor implements PCOs plus four of the IEC 1131-3 languages (LD, ST, SFC, and FB). Any control schemes built in those languages are translated into a Java file, compiled, and downloaded. The IEC 1131-3 concept of configurations, resources, programs, and tasks are translated into the native environment that consists of set of native platforms. In addition, the Control Editor supports defining of control schemes using PCOs in the same manner that it supports the use of IEC Function Blocks; supports the assignment of control entities to specific PCO platforms; the importation of instruments lists to generate, and PCOs.

5.3.3 The Graphic Editor

The Graphic Editor support all of the human interface (HI) functionality and graphics typical of this type of editor.

5.3.4 Application Configuration

Applications can only be assigned to native web servers.

5.3.4.1 Historian Object Editor

A historian object when found in a CO is a representation of a portion of the full historian configuration, e.g., a slice of the historian. The historian object consists of the name of the historian to receive the data and a list of PCO attributes. Each attribute is associated with certain critical information related to the historian, e.g., change deltas, sample rates, reduction operations, archive characteristics, etc. Starting the historian editor resulting in showing the full configuration of the historian(s) to which this object is assigned.

5.3.4.1.1 Historian Data Definition Object Editor

One historian object exists for each historian in the system. These objects are created automatically if a historian data definition object is created and assigned to a historian. The data in this object controls the general function of the historian, e.g., where it runs in the system, what its archive policy is, what its data reduction policy is, etc.

5.4 Process Control 5.4.1 Definition of the Process Control Domain

The process control domain is usually divided into three primary control styles: (i) analog control (continuous), (ii) logic control (ladder logic), and (iii) sequential control (supervisory operation of logic and analog control structures). In addition, every process control system must address batch (or recipe based) manufacturing with the related topics of lot tracking and validation.

The illustrated control system 10 views these styles as particular visualizations of the process control functionality. This means that these three types of control do not exist as objects. Rather, the control system receives a class definition of a process control object (PCO) which it instantiates and executes. It is the responsibility of the control editor to create the correct representation of the control structure while also representing that control structure in one of the industry standard formats, i.e., ladder-logic, function blocks, or structured text, or PCOs directly Sequential Function Charts are a meta-language used to control the execution of the other three languages. In the illustrated embodiment, it serves as a wrapper class for the other classes. The source code for a control scheme and the critical values for its PCO attributes, i.e., its checkpoint file, are held in the non-volatile memory of the Native device.

5.4.2 Process Control Objects 5.4.2.1 PCO Attributes

The fundamental control object is a PCO attribute. As noted above, these are provided in two types: variables and parameters. An example of a variable attribute is a measurement in a PID block. In the illustrated system, a PCO attribute is an object in its own right and it contains certain vital information when it is retrieved. This information is "atomic", i.e., all information is obtained with an attribute, not just its "value". The minimal set of information from a PCO variable attribute is value, data type, quality information time tag in milliseconds, and alarm status. It is this object that is transferred from one PCO to another to implement the transfer of information needed in an actual control scheme.

Parameter attributes bundle less information than a variable attribute. The typical example of a parameter attribute is the proportional band of a PID block. In the illustrated control system 10, this attribute has less supporting information than a variable attribute, e.g., it would not have an engineering unit range.

5.4.2.2 PCO Blocks

PCO attributes and methods to operate on those attributes are combined into PCO Blocks. These blocks are analogous to the control blocks in other systems, e.g., I/A Series FoxBlocks, IEC 1131-3 Function Blocks, and Foxboro Microspec Blocks. However, because they are implemented in Java, they can be executed on any microprocessor running any OS that supports a JVM. In addition, they are designed to occupy only the amount of RAM required for the selected options and to be on-line replaceable.

PCO blocks capture and encapsulate knowledge of regulatory control algorithms needed to by continuous processes. The PCO user block can be used to integrate particular user-defined control algorithms into a PCO control scheme. It is the PCO user block that is used to implement control strategies that are defined using one of the IEC 1131-3 control languages.

5.4.2.3 PCO Composites

PCO Composites are implementations of a control strategy. They consist of PCO blocks and other PCO composites linked in such a manner as to provide the control mechanisms needed for a particular process. It is the PCO composite that captures application level control expertise, e.g., complex control structures for major pieces of equipment or even the simpler idioms of cascade control.

5.4.3 PCO Execution Environment

The PCO execution environment is the software in a native control device that supports the execution of PCOs. This software includes the JVM and any other required code, such as a class loader that loads stand-alone applications for each composite, a class loader that loads an applet for each composite, a block processor that loads Java byte codes for a composite and executes each composite in turn, and a block processor that loads Java byte codes for PCO Blocks and executes each blocks in turn.

5.5 Communications 5.5.1 Requirements 5.5.1.1 Communication Model Definition

Several types of communication are provided in the illustrated control system 10. These types include data transfer, message transfer between application programs, object movement (downloads), class file (code) transfers, and events (unsolicited messages).

The communications mechanism is redundant, i.e., the failure of one station in the system does not prevent communication (new or established) between any two other stations. It also minimizes the impact on uninvolved stations when the service is used by its clients, e.g., a message is not sent to a network segment if it is not going to be used there. The communications mechanism, moreover, provides an encapsulated implementation that can be replaced "under the hood" as new technologies become available. Also, it allows the illustrated control system 10 to be configured for the appropriate communication resources, e.g., the number of outbound connections. Moreover, it provides performance statistics, e.g., high, low, average transfer times between two stations, bytes per seconds between two stations, etc., for viewing in the system monitor. Still further, it automatically reconnects to an object if it is relocated on or removed from/restored to the network.

Data transfer in the illustrated control system 10 is provided by a mechanism that permits clients to subscribe to updates in a object. It also provides a mechanism for one-shot get/set access to an object. A client of the data transfer facility supplies the control system with a (i) number of objects that it needs, (ii) conditions under which it wants updates: change delta, maximum time between updates, or both, (iii) be capable of retrieving the values all at once (a snapshot), and (iv) be capable of retrieving the values as series of changes with the option to block, for a user specified amount of time, while waiting for a change. Client publication (write lists) are not supported in the illustrated embodiment. Target devices subscribe to the data in the source device.

With respect to client one-shots (get), the client of the data transfer facility supplies the system with a number of objects that it needs and retrieve the values all at once (a snapshot). Conversely, with respect to client one-shots (set), the client supplies the system with a number of objects that it wishes to change, and set any part of the object if it has access. The parts referred to are the supporting information in a PCO attribute as well as the value part.

5.5.1.1.1 Message Transfer 5.5.1.1.1.1 General

While the message transfer mechanism is a general case of the data transfer mechanism, its requirements are given separately. The client of the message transfer facility must support private conversations between applications using a reliable communications mechanism and support by subscription publication of information from one server to many clients.

5.5.1.1.1.2 Private Conversations

The private conversation mode allows applications to find each other by their application name: the client application is not required to know the station name or IP address of the server application. It also allow applications to send records (messages) of arbitrary size: the private conversation mode guarantees that the message boundary is recognized and that order is preserved. Moreover, it allows both the sending and receiving process to determine if the connection is lost. Still further, it supports transaction based message transfer, i.e., the sender does not get an acknowledgement until the receiver says that the message is safely stored.

5.5.1.1.1.3 Subscriptions

The subscription facility supports senders and listeners. A sender is a process that has data that may be of interest to one or more listeners. The subscription mode supports this type of operation by allowing a "sending" process to register that it will produce messages of a particular type, allowing a "listening" process to register to receive all messages of a particular type, supporting transaction based subscription if the client so requests (this request would have no impact on the sender), and supporting transaction based publishing by a server if the server requests it (this request would have no impact on the receiver). If no listeners are registered, the subscription facility defines how the message is handled.

5.5.1.2 Security

The native communications system is linked to the native security system to ensure that unauthorized users are unable to access objects. The illustrated control system 10 does not arbitrate between users of a resource. The prevention of multiple access to an object is the responsibility of the object. The breaking of an application secured link by an operator is not a function of the illustrated control system 10.

5.5.1.3 Object Location Services

Object are located by name. To this end, the object location service supports the location of named objects; supports hierarchical object names; allows rule based specification of the name delimiting character; locates an object based on a "longest fit" because (a) not all parts of an object name are globally known and (b) not all parts of an object are in the same physical location; supports the implementation of naming scopes, i.e., limiting the visibility of names; supports the use of a name search path so that relative names can be located; is redundant; supports locating many types of objects, e.g., server processes, PCO attributes, and application programs; and supports the addition of related information about the object in the name directory, e.g., object type, short-cut information to be used by the process that owns the object, object type/implemented interface, and information. With respect to the last item, the object location services permit a client to request the name of a service that supports a specific interface. This allows new interfaces to be added to a service without breaking an old one.

5.5.1.4 Networks

The illustrated control system operates over any IP based network 48. By way of non-limiting example, the illustrated control system 10 operates over wide area networks supplied by the customer, installed plant LANs supplied by the customer, dedicated LANs supplied either by the customer or the vendor, redundant LANs supplied by the vendor. This operation is transparent to all applications using the system 10. While it is recognized that performance are degraded over low bandwidth (phone lines) and high latency (geosynchronous satellites) networks, the system 10 optimizes as best it can to minimize the impact of different network types. In short, the illustrated control system 10 does not assume that it "owns" the network

5.5.1.5 Quality of Service

5.5.1.5.1 Performance

Assume that the illustrated control system 10 is operating in support of a PCO in a dedicated control station (not a transmitter) or in a PC, it supports at least 10,000 object value gets/sets per second if the object is in the local station; supports at least 100 get/set per second requests from a client if the object is in a remote station;, supports at least 50 get/set requests per second made to a server from a remote client; is able to locate 3000 objects per second; is able to detect a communication failure in no more than 1000 milliseconds; ensures that the time to move data from a server station to a client station (API call to API call) is less than 100 milliseconds in a normally configured network; allows a server station to move 6000 values out of its box every second; allows a client station to accept at least 2000 values every second; allows an unlimited (but, configured) number of names to be defined in the system; and supports the registration of 50,000 globally known names without requiring a reconfiguration. All server stations are able to support at least 30 client stations for continuous data feed without requiring a reconfiguration. All client stations support at least 30 server stations for continuous data feeds without requiring a reconfiguration.

5.5.1.6 APIs

Within the illustrated control system 10 environment an API are provided for all of the above services. This API are delivered as a Java Bean so that the underlying communications mechanism may be replaced without breaking all of the applications that use the service.

5.5.1.7 Maintenance and Upgrades of Messaging Services

The illustrated control system 10 defines and enforces a mechanism for supporting inter-operability of messages from stations at different versions. A mechanism like interface inheritance is provided, i.e., a message carries in it enough "type" information that the receiving application knows how to "decode" the message even if the receiving application is at a lower level. This adds fields to messages if necessary, but not remove/replace old fields.

5.5.1.8 Integration of non-Native Based Systems

The illustrated control system 10 supports integration of non-Java applications using appropriate technologies, e.g., CORBA, COM/DCOM/ActiveX, and emulation of APIs. Physical gateways are permitted, but these gateways provide only a minimal amount of configuration.

5.5.1.9 Object Location Service Implementation

5.5.1.9.1 The All Java Approach

5.5.1.9.1.1 Description

JINI and JavaSpaces technologies permit object location within the illustrated system. JINI technology allows native devices to register names in a globally available database. JINI clients can find this database and perform searches against it. JavaSpaces allow a device to register important information in a globally available bulletin board. JavaSpaces provide four simple services: posting, removal, query by example, and notification. The notification feature informs prospective users of a class of objects when such objects are added and removed from the JavaSpace. A JavaSpace handles services like system monitoring.

5.5.1.9.2 The Enhanced Object Manager Approach

5.5.1.9.2.1 Description

As an alternative, an enhanced object manager (EOM) approach to address location and connection of data clients and servers can be utilized as follows:

1) A LDAP compliant service are created and used to store pathnames and related information, e.g., IP addresses, Port Numbers, internal indexes, etc.
2) The EOM API provides get/set and read/write support similar to that provided by the OM today.
3) When provided a name, the EOM looks in the local copy of the LDAP database.
4) If the name is found and the data is local, the request is passed to the correct data provider (the EOM, the CIO database, or the AOS database) who returns the value and other data. The EOM handles sending updates on change driven data.
5) If the name is found and not local, the EOM sends the request to the remote EOM which then makes a local query. The EOM handles sending updates on change driven data
6) If the name is not found locally, the location request is passed to the master LDAP database. If it is found there, the address information is passed back to the local LDAP database (which is updated) and steps 4) and 5) are repeated.

7) If the name is not found remotely, the request is posted for a period of time. If it is resolved in that period, the requesting station is notified. If it is not resolved, the master LDAP database drops the name and notifies the requesting station.

5.6 Critical Applications

5.6.1 Time Synchronization

SNTP (Simple Network Time Protocol) is used to keep operator stations and similar non-process data producers in sync. This protocol is as accurate as 1 ms in a carefully controlled environment, but 50 ms is more common on shared networks. Controllers requiring high accuracy are placed on tightly controlled networks or equipped with an interrupt used to coordinate time updates. In either case, a master timekeeper tied to a well known reliable data source—GPS clock or broadcasted time from the national atomic clocks. This master time keeper generates the interrupt and SNTP. It is built with a highly reliable internal clock so that loss of time feed does not result in significant drift within the Mean Time to Repair (MTTR).

5.6.2 Alarm and Message Management

Alarm and message manage requires that all process alarming to be based on the top-level composite's attributes; that acknowledgments be handled at the composite level; that PCOs, system monitors, and the native human interface a reliable message protocol to send the message to a message management system (MMS); that the MMS is used by end-users to view the current alarm state and the alarm history; and that the MMS use the plant historian to permanently store and archive messages.

To meet the control market's requirement for a message management system, the illustrated control system 10 provides a message management support service (MMSS) in the native devices that are used to deliver messages to a Message Manager. The service operates as follows.

When a client of the MMSS connects to the MMSS server, the MMSS server send any messages in its internal alarm queue that are older than the time of the connection to the client; transmits the alarm state at the time of the connection to the client, and transmit any new messages subsequent to the connection If the connection to the MMSS client fails, there is no impact on the operation of the control station or the control network; minor delays associated with detecting the loss of connection are generally viewed as acceptable. The MMSS support at least two (2) and, preferably, four simultaneous clients.

The alarm state of a PCO attribute is defined to include block attribute identification (full PATH attribute name, at least); the bad I/O status of the block for I/O attributes; an indication of the alarm status for each alarm type defined for the attribute; the priority, criticality, and acknowledgment status of the attribute; the on/off status of the attribute, i.e., is it updating; the status of the alarm inhibit and alarm disable or alarm option parameters, and the time tag of each alarm event stored within the block, e.g., the into alarm time, the acknowledged time, and the return to normal time. This information is recovered from all currently active alarms.

5.6.2.1 Configuration

5.6.2.1.1 Process Alarms

When a composite is configured, the application engineer specifies which attributes of the PCOs within the composite are to be annunciated. When a composite is placed on line, it notifies the object location service that it exists. A message management service are notified of the new composite and arrange for notification from the device.

5.6.2.1.2 System Alarms and Messages

No user configuration is required to get these alarms into the MMS. The sources of such messages arranges for the appropriate notification.

5.6.2.1.3 Native Operator Actions

No user configuration is required to get these alarms into the MMS. The sources of such messages arranges for the appropriate notification.

5.6.2.2 Native Message Management Service

The MMS are centralized and redundant. It provides a complete alarm state for the plant at any time including startup. It retains a message history for as long as configured through the use of the plant historian. Users view the alarms through to the Alarm Manager.

6 Native Hardware Subsystems

6.1 Field Devices

6.1.1 Overview

The native field devices are coupled to the network 48 via an IP network, preferably, Ethernet and, still more preferably, powered Ethernet. Powered Ethernet delivers the power, along with conventional Ethernet data. To this end, the native field devices use one of two wiring schemes, with each scheme supplying power to the field device: (a) standard four wire 10Base-T wiring, or (b) industry standard two-wires used for 4–20 ma based transmitters. The devices also provide a single Ethernet interface (or redundancy, where desired in the cabling or the field device); and connect to a non-redundant powered hub with the following features: (a) non-redundant connections to the IFDs; and (b) support for redundant connection to a plant-wide network. Where used, the powered Ethernet implementation leaves the physical and logical Ethernet interfaces in place. This means that except for adding a new wiring type, the physical layer, the data link layer, the use of CSMA/CD, and 10Base-T connectors are preserved The illustrated embodiment utilizes powered Ethernet hubs to provide communications and power to its intelligent field devices. These IFDs may be transmitters, actuators, Networked I/O, or PCO platforms. The powered hubs are preferably, stackable, DIN rail-mountable, support connection to a redundant network, and support both 10 Mbps and 100 Mbps Ethernet.

A further understanding of the operated of the powered Ethernet network and of the circuitry used within the native field and control devices to draw power therefrom may be attained by reference to U.S. patent application Ser. No. 09/444,827, now U.S. Pat. No. 6,640,308, filed Nov. 22, 1999, entitled POWERED ETHERNET FOR INSTRUMENTATION AND CONTROL, and by reference to the corresponding PCT Patent Application US00/10013, filed Apr. 14, 2000, the teachings of which are incorporated herein by reference.

On the software side, specific implementations of the native field devices support web based configuration, as described above. The support is supplied by including an embedded web server with a selection of pages used for configuration and maintenance.

6.1.2 Transmitters

Intelligent transmitters use the IEEE 1451 standard to communicate to their sensor(s). This facilitates use of the same module in many types of transmitters from potentially many vendors and allows the transmitter to support up to 255, perhaps externally mounted, sensing devices.

6.1.3 Positioners

Figure 6:
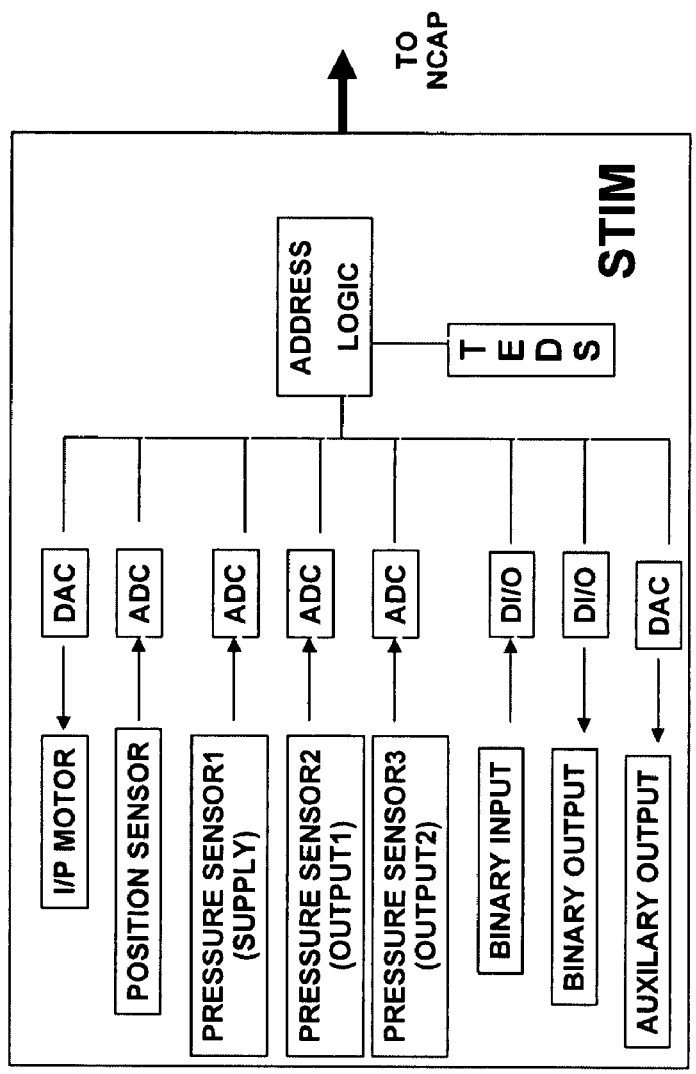
FIG. 6 depicts a native intelligent positioner implementation according to the invention.

The native intelligent positioners also support a powered Ethernet interface like the one used by the native intelligent transmitters. FIG. 6 shows a preferred native intelligent positioner implementation. The approach standardize interfaces and use a PCO to control the positioner as evident in the drawing.

6.2 Summary of Hardware/Software Features by Station Type

A summary of the features of native control devices follows. Blank cells indicate that the feature is not present in the indicated device.

| Features | Xmitter | Positioner | Controller | Integrator | PC based Operator Consoles | Native Workstation | PC Based Web Server | Solid-state Web Server | SS DHCP Server | SS bulletin board |
|---|---|---|---|---|---|---|---|---|---|---|
| Low power, high performance CPU | Yes | Yes | | | | Yes | | | | |
| Top performance CPU | | | Yes | Yes | Yes | Yes | Yes | Yes | | |
| RAM | Yes | Yes | Yes | Yes | Yes | Yes | Yes | Yes | Yes | Yes |
| ROM | Yes | Yes | Yes | Yes | Yes | Yes | Yes | Yes | Yes | Yes |
| Flash | Yes | Yes | Yes | Yes | | Yes | Yes | Yes | Yes | Yes |
| Sensor I/F (IEEE 1451) | Yes | Yes | | | | | | | | |
| Powered Ethernet (2 wire) | Yes | Yes | | | | | | | | |
| Serial I/F (RS-232/485/422/423) | Yes | Yes | | Yes | | | | | | |
| Ethernet (10Base-T) | Yes | Yes | Yes | Yes | Yes | Yes | Yes | Yes | Yes | Yes |
| Wireless Ethernet | | | | | | Yes | | Yes | | |
| the TCP/IP suite | Yes | Yes | Yes | Yes | Yes | Yes | Yes | Yes | Yes | Yes |
| DHCP Server | | | | | | | Yes | Yes | Yes | Yes |
| Full OS | Yes | Yes | Yes | Yes | Yes | Yes | Yes | Yes | Yes | Yes |
| Java Virtual Machine | Yes | Yes | Yes | Yes | Yes | Yes | Yes | Yes | Yes | Yes |
| Web Server | Yes | Yes | Yes | Yes | | Yes | Yes | Yes | Yes | Yes |
| Device Configurator | Yes | Yes | Yes | Yes | | | | | Yes | Yes |
| Annunciator Keyboard | | | | | Yes | Yes | | | | |
| Touchscreen | | | | | Yes | Yes | | | | |
| Mouse/Trackball | | | | | Yes | Yes | | | | |
| Display | | | | | Yes | Yes | Yes | Yes | | |
| Hard drive | | | | | Yes | Yes | | | | |
| Solid State Bulk Storage | | | | | | Yes | | Yes | | |
| System Monitor | | | | | | | Yes | Yes | | |
| Process Control Objects (PCOs) | Yes | Yes | Yes | Yes | Yes | Yes | Yes | Yes | | |
| System Management Objects | Yes | Yes | Yes | Yes | Yes | Yes | Yes | Yes | Yes | Yes |
| Omnibus Messaging Services | Yes | Yes | Yes | Yes | Yes | Yes | Yes | Yes | | |
| Profibus PA Support | Opt. | Opt. | | Yes | | | | | | |
| Profibus DP Support | Opt. | Opt. | | Yes | | | | | | |
| HART Support | Opt. | Opt. | | Yes | | | | | | |
| FoxComm Support | Opt. | Opt. | | Yes | | | | | | |
| Fieldbus HSE Support | Opt. | Opt. | | Yes | | | | | | |
| Fieldbus H1 Support | Opt. | Opt. | | Yes | | | | | | |
| DeviceNet | Opt. | Opt. | | Yes | | | | | | |
| LONworks | Opt. | Opt. | | Yes | | | | | | |
| Modbus | | | | Yes | | | | | | |
| Modbus+ | | | | Yes | | | | | | |
| ABDH | | | | Yes | | | | | | |
| I/A Series Nodebus | | | | Yes | | | | | | |
| I/A Series Fieldbus (FoxComm) | Opt. | Opt. | | Yes | | | | | | |
| Application Development Environment | | | | | | | | Yes | | |

-continued

| Features | Xmitter | Positioner | Controller | Integrator | PC based Operator Consoles | Native Workstation | PC Based Web Server | Solid-state Web Server | SS DHCP Server | SS bulletin board |
|---|---|---|---|---|---|---|---|---|---|---|
| Historian | | | | | | | Yes | | | |
| Time Synchronization | | | | | | | Yes | Yes | | |
| PIMS | | | | | | | Yes | | | |
| Message Management | | | | | | | Yes | | | |

We claim:

1. A control device for a control system, the control device comprising
    a processor that executes a control algorithm that at least one of (i) maintains the control system at a desired level, and (ii) drives it to that level as a function of one or more measured values and one or more setpoints,
    a web server that facilitates any of configuration, monitoring and maintenance of the control system or one or more other control devices,
    the control device further comprising any of (i) a sensor for sensing any of a temperature, level or other characteristic of a process controlled by the control system, and (ii) an actuator for the process controlled by the control system.

2. The control device of claim 1, wherein
    the control device comprises an interface to an IP network, and
    on startup, the control device registers a characteristic thereof with at least one other device on the IP network.

3. The control device of claim 2, wherein the control device issues to the IP network, via the interface, a request for assignment of an IP address.

4. The control device of claim 2, wherein the control device receives a device identification name from any of (i) a user-configured hub or other device to which the control device is coupled, (ii) a letterbug installed in the control device, (iii) a digital data processing apparatus, (iv) a software generated letterbug.

5. The control device of claim 2, wherein the control device registers the characteristic with a bulletin board on the IP network.

6. The control device of claim 5, wherein the control device registers the characteristic with in a Javaspace on the IP network.

7. The control device of claim 2, wherein the control device communicates with another device over the IP network in order to obtain configuration information.

8. The control device of claim 2, wherein the control device retains configuration information for use at startup.

9. The control device of claim 2, wherein the web server any of (i) collects process data from one or more control devices, (ii) generates source for operator displays, (iii) provides access to the control system, and (iv) hosts an applications development environment.

10. The control device of claim 9, wherein the control device comprises a configuration editor.

11. The control device of claim 2, wherein the control device is any of a control station, operator console, personal computer, handheld computer, workstation, integrator, or controller.

12. A control system comprising a plurality of control devices coupled via one or more IP networks, wherein one or more selected control devices
    A. execute a control algorithm that at least one of (i) maintains the control system at a desired level, and (ii) drives it to that level as a function of one more measured values and one or more setpoints,
    B. comprises a web server that facilitates any of configuration, monitoring and maintenance of the control system or one or more other control devices, and
    C. wherein at least one of the selected control device comprises any of (i) a sensor for sensing any of a temperature, level or other characteristic of a process controlled by the control system, and (ii) an actuator.

13. The control system according to claim 12, wherein a said IP network is powered.

14. The control system of claim 13, wherein one or more of the control devices receive operational power from said IP network that is powered.

15. The control system comprising of claim 12, comprising a DHCP server that furnishes IP addresses in response to request by one or more of the control devices.

16. The control system of claim 15, wherein the DHCP server is solid state.

17. The control system of claim 16, wherein the DHCP server is free of moving parts and comprises zero, one or more removable components.

18. The control system of claim 12 comprising
    a network enabler that is coupled to the IP network that responds to requests by the control devices to at least one of (i) register names specified by the control devices, (ii) search for names specified by the control devices, (iii) posting to a network bulletin board events specified by the control devices, (v) removing from the network bulletin board for events specified by the control devices, (vi) querying the network bulletin board for events specified by the control devices, (vii) notifying the control devices of events specified by the control devices.

19. The control system of claim 18, wherein the network enabler is any of a JINI and a JavaSpace server.

* * * * *

UNITED STATES PATENT AND TRADEMARK OFFICE
CERTIFICATE OF CORRECTION

| | |
|---|---|
| PATENT NO. | : 7,020,532 B2 |
| APPLICATION NO. | : 10/756187 |
| DATED | : March 28, 2006 |
| INVENTOR(S) | : Alexander Johnson et al. |

Page 1 of 1

It is certified that error appears in the above-identified patent and that said Letters Patent is hereby corrected as shown below:

Col. 29 claim 6, Line 47, following "characteristic", please delete "with in" and insert --within--.
Col. 30 claim 12, Line 23, following "function of one", please insert --or--.
Col. 30 claim 12, Line 28, following "control", please delete "device" and insert --devices--.
Col. 30 claim 15, Line 37, following "control system", please delete "comprising".
Col. 30 claim 15, Line 39, preceding "by one", please delete "request" and insert --requests--.
Col. 30 claim 18, Line 52, following "bulletin board", please delete "for".

Signed and Sealed this

Third Day of October, 2006

JON W. DUDAS
*Director of the United States Patent and Trademark Office*